(12) United States Patent
Sanders et al.

(10) Patent No.: US 9,772,755 B2
(45) Date of Patent: Sep. 26, 2017

(54) REMOTE CONTROL FOR DISPLAYING APPLICATION DATA ON DISSIMILAR SCREENS

(71) Applicant: Microsoft Technology Licensing, LLC, Redmond, WA (US)

(72) Inventors: John R. Sanders, Seattle, WA (US); Kevin H. Kahl, Redmond, WA (US); Feng Yu, Sammamish, WA (US); Jing Han Shiau, Redmond, WA (US); Joshua S. Bolduc, Seattle, WA (US); Patrick S. Boyd, Seattle, WA (US); Kha Lam, Renton, WA (US); David M. Gray, Bellevue, WA (US); Roopesh Kumar Rajamani, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 14/246,806

(22) Filed: Apr. 7, 2014

(65) Prior Publication Data
US 2015/0143271 A1     May 21, 2015

Related U.S. Application Data

(60) Provisional application No. 61/905,117, filed on Nov. 15, 2013.

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0481* (2013.01); *G06F 3/0488* (2013.01);
(Continued)

(58) Field of Classification Search
CPC .. G06F 3/04842; G06F 3/0481; G06F 3/0482; G06F 3/0488; G06T 2200/24
See application file for complete search history.

(56) References Cited

U.S. PATENT DOCUMENTS

2006/0150182 A1* 7/2006 Hughes ................. G06F 8/61
717/174
2007/0130205 A1* 6/2007 Dengler .............. G06F 9/4443
(Continued)

FOREIGN PATENT DOCUMENTS

EP         2657837 A1 * 10/2013   ........... G06F 9/4445

OTHER PUBLICATIONS

The Second Written Opinion for International Application No. PCT/US2014/065110, date of mailing: Sep. 24, 2015, date of filing: Nov. 12, 2014, 9 pages.
International Preliminary Report on Patentability for International Application No. PCT/US2014/065110, date of mailing: Jan. 28, 2016, date of filing: Nov. 12, 2014, 16 pages.
International Search Report and Written Opinion for International Application No. PCT/US2014/065110, date of mailing: Feb. 20, 2015, date of filing: Nov. 12, 2014, 10 pages.
(Continued)

*Primary Examiner* — Tuyetlien T Tran
(74) *Attorney, Agent, or Firm* — Christopher J. Volkmann; Kelly, Holt & Christenson, PLLC

(57) ABSTRACT

A remote control service on a mobile device interrogates a program on another computing device to obtain metadata describing the structure of information being displayed on the computing device. The remote control service then calculates a different data structure that is used to display a subset of the data on the display screen of the mobile device.

15 Claims, 30 Drawing Sheets

(51) Int. Cl.
  *G06F 3/14* (2006.01)
  *G06F 3/0481* (2013.01)
  *G06F 3/0488* (2013.01)
(52) U.S. Cl.
  CPC ........ *G06F 3/1454* (2013.01); *G06T 2200/24* (2013.01); *G09G 2340/0407* (2013.01)

(56) References Cited

U.S. PATENT DOCUMENTS

| | | | |
|---|---|---|---|
| 2007/0271353 A1 | 11/2007 | Manchester et al. | |
| 2010/0131854 A1* | 5/2010 | Little | G06F 3/0486 715/735 |
| 2012/0030584 A1 | 2/2012 | Bian | |
| 2012/0208639 A1 | 8/2012 | Reynolds et al. | |
| 2013/0290856 A1 | 10/2013 | Beveridge et al. | |
| 2014/0055495 A1* | 2/2014 | Kim | G09G 5/32 345/660 |
| 2015/0205447 A1* | 7/2015 | Jia | G06F 3/0481 715/790 |

OTHER PUBLICATIONS

"Epson iProjection App", Published on: Jun. 16, 2013, Available at: http://www.epson.com/cgi-bin/Store/jsp/Landing/ProjectorApp.do.
Blandford, Rafe, "Control Documents on your PC with Office Remote for Windows Phone", Published on: Nov. 20, 2013, Available at: http://allaboutwindowsphone.com/news/item/18759__Control_documents_on_your_PC_w.pp.
Myers, et al., "Taking Handheld Devices to the Next Level", In Journal of Computer archive, vol. 37, Issue 12, Dec. 2004, 8 pages.
Tsang, Simon, "Sailing Clicker for Mac", Published on: Apr. 1, 2006, Available at: http://www.smh.com.au/news/hardware/salling-clicker-for-mac/2006/03/29/1143441215061.html.
"Xbox SmartGlass", Published on: Jun. 10, 2013, Available at: https://play.google.com/store/apps/details?id=com.microsoft.smartglass.
"Apple Keynote Remote", Retrieved on: Nov. 26, 2013, Available at: https://itunes.apple.com/us/app/keynote-remote/id300719251.
Communication Pursuant to Article 94(3) EPC for European Patent Application No. 14819119.0 dated Apr. 13, 2017, 10 pages.

* cited by examiner

REMOTE CONTROL FOR DISPLAYING APPLICATION DATA ON DISSIMILAR SCREENS

CROSS-REFERENCE TO RELATED APPLICATION

The present application is based on and claims the benefit of U.S. provisional patent application Ser. No. 61/905,117, filed Nov. 15, 2013, the content of which is hereby incorporated by reference in its entirety.

BACKGROUND

Computing systems are currently in wide use. Such computing systems often run various different types of applications that generate user interface displays that are displayed on the display screen of the devices running them. Such programs can include productivity applications, such as word processing applications, spreadsheet applications, and presentation applications (among others) as well as operating systems, drawing systems, and other programs.

Many users of computing systems also have multiple different computing devices. One computing device may be a device having a relatively large screen, such as a desktop computer or laptop computer, while another computing device may have a smaller display screen, such as a mobile device. Such mobile devices can include, for instance, smartphones, tablet computers, personal digital assistants, etc.

It is not uncommon for the two types of devices (or even more devices) to communicate with one another using near field communication or other communication mechanisms. In doing so, some applications allow for a mobile device to receive the displays that would be generated on the desktop device, when an application is running. However, in such systems, the displays on the mobile device are the same as those displayed on the desktop device. However, because the mobile device has a much smaller display screen, the display is quite awkward and can be cumbersome to navigate and view.

The discussion above is merely provided for general background information and is not intended to be used as an aid in determining the scope of the claimed subject matter.

SUMMARY

A remote control service on a mobile device interrogates a program on another computing device to obtain metadata describing the structure of information being displayed on the computing device. The remote control service then calculates a different data structure that is used to display a subset of the data on the display screen of the mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
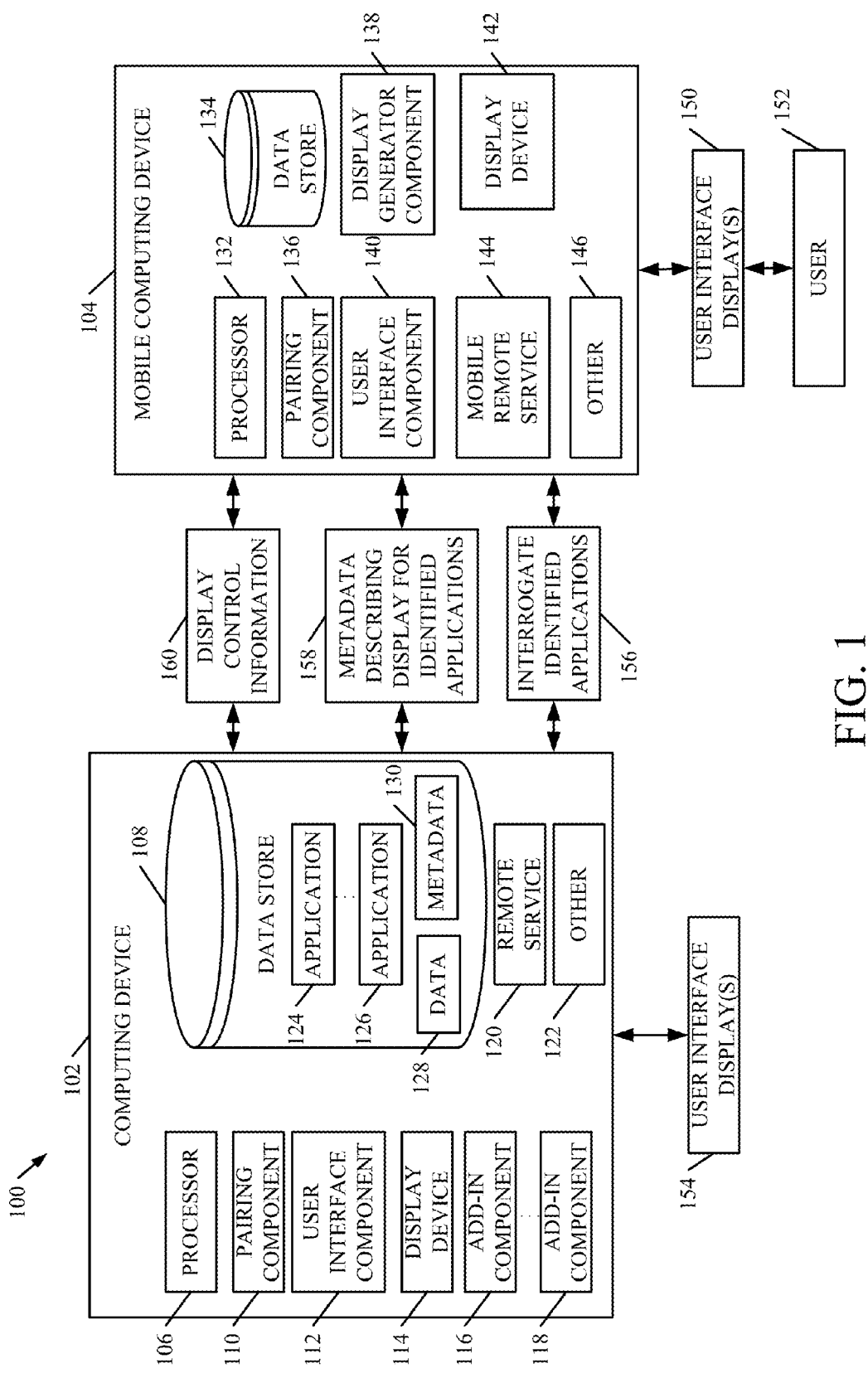
FIG. 1 is a block diagram of one illustrative remote control architecture.

FIG. 1 shows a block a diagram of one illustrative remote control architecture 100. Architecture 100 includes computing device 102 and mobile computing device 104. In one embodiment, computing device 102 is a computing device with a relatively large screen compared to the display screen of mobile computing device 104. For instance, in one embodiment computing device 102 is a desktop computer or a laptop computer and mobile computing device 104 is a tablet computer or a smartphone or another mobile computing device. In the example shown in FIG. 1, computing device 102 illustratively includes processor 106, data store 108, pairing component 110, user interface component 112, display device 114, add-in components 116-118, remote service 120 and it can include other items 122 as well. Data store 108 illustratively includes a set of applications 124-126, as well as data 128 and metadata 130.

Mobile computing device 104 illustratively includes processor 132, data store 134, pairing component 136, display generator component 138, user interface component 140, display device 142 and mobile remote service 144. It can also include other items 146 as well.

In the embodiment shown in FIG. 1, mobile computing device 104 (and specifically user interface component 140) illustratively generates user interface displays 150 that have user input mechanisms that can be actuated by user 152. User 152 can thus interact with user interface displays 150 to control and manipulate mobile computing device 104.

FIG. 1 also shows that computing device 102 illustratively generates one or more user interface displays 154. In the embodiment shown, user 152 illustratively interacts with user interface displays 150 to control the applications and the user interface displays 154 generated by the applications, on computing device 102. In doing so, as will be described in greater detail below, mobile remote service 144 illustratively interrogates computing device 102 to identify the applications that are open on computing device 102, or that have been recently used. Interrogation is represented by block 156 in FIG. 1. In response, remote service 120 in computing device 102 provides metadata describing the display and other information for open applications, or for those that have been recently used. This is indicated by block 158. Mobile remote service 144 then provides control information 160 to computing device 102 in order to control the applications running on computing device 102, the user interface displays 154, and in some cases to control computing device 102 in other ways as well.

Figure 2A:
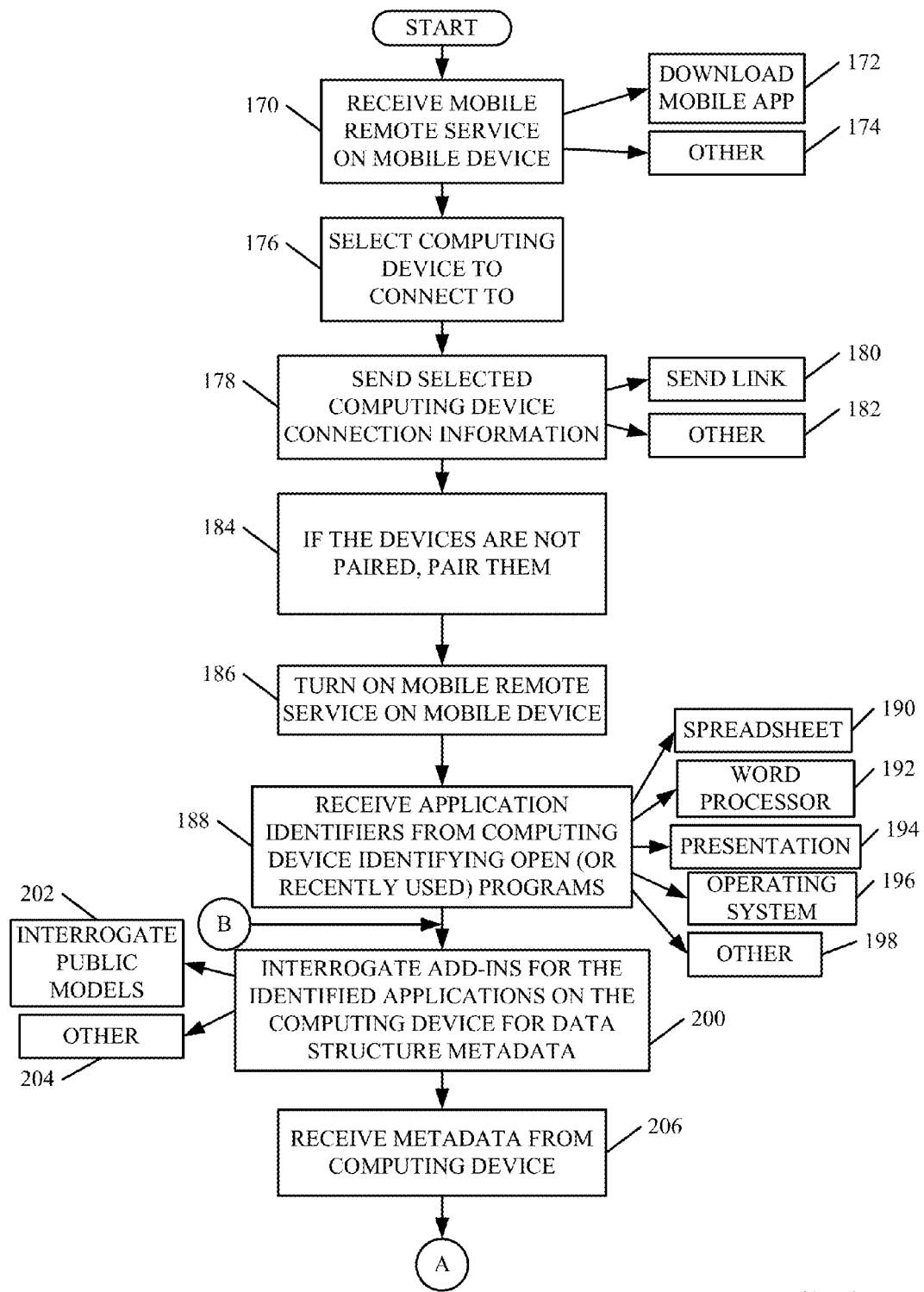
FIGS. 2A and 2B (collectively referred to as FIG. 2) show a flow diagram illustrating one embodiment of the operation of the architecture shown in FIG. 1.
Figure 2B:
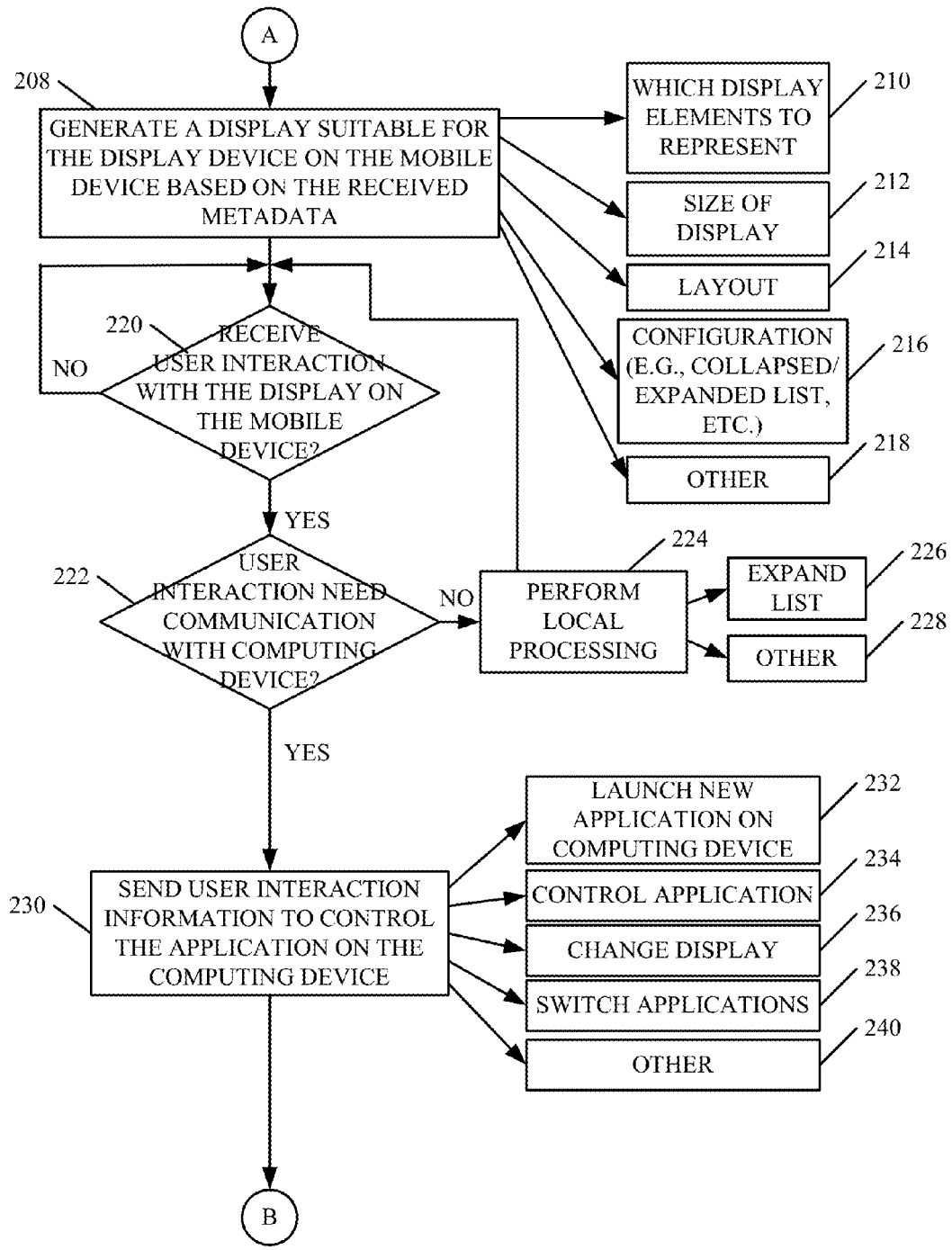
Figure 3A:
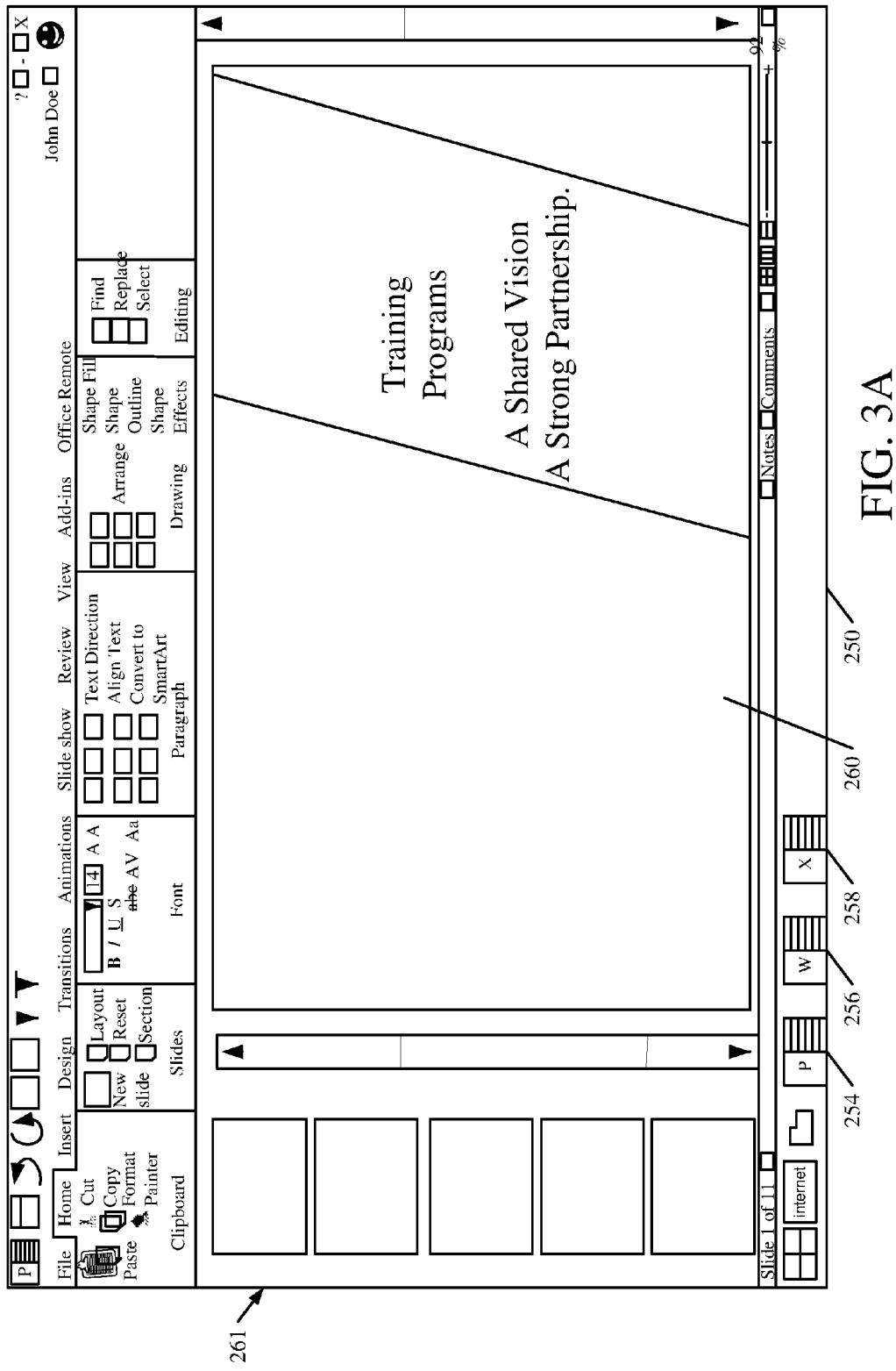
FIGS. 3A to 3N-2 show examples of user interface displays.

FIGS. 2A and 2B (collectively referred to as FIG. 2) show a flow diagram illustrating one embodiment of the operation of the architecture shown in FIG. 100, in more detail. FIGS. 3A-3N show illustrative user interface displays that are generated by mobile device 104 and computing device 102, in various embodiments.

In one embodiment, user 152 first powers up mobile computing device 104 and provides an indication that user 152 wishes it to be configured to perform remote operations with computing device 102. User 152 then provides inputs indicating that mobile computing device 104 is to download mobile remote service 144. This can be done, such as by ordering the mobile remote service 144 as a mobile application from a cloud service or another service. Receiving the mobile remote service 144 on mobile device 104 is indicated by block 170 in FIG. 2. Downloading the service as a mobile application is indicated by block 172. Of course, the mobile remote service 144 can be received on mobile device 104 in other ways as well, and this is indicated by block 174.

Pairing component 136 illustratively walks the user through a process by which user 152 can pair mobile computing device 104 with another computing device (such as computing device 102). In doing so, pairing component 136 illustratively displays a list of computing devices that user 152 can connect to. These may be computing devices that mobile computing device 104 detects in its vicinity, using near field communication or otherwise. In addition, the displayed computing devices can be other computing devices that are used by user 152, and that are known to mobile computing device 104. Receiving a user selection of a computing device to connect to is indicated by block 176 in FIG. 2.

Mobile remote service 144 then sends the selected computing device connection information. This is indicated by block 178 in FIG. 2. The connection information can, for example, be a link that the user of computing device 102 is to actuate. When the user actuates the link, remote service 120 on computing device 102 illustratively sends information to mobile device 104 that includes an installation tool for installing mobile remote service 144. Sending a link is indicated by block 180 in FIG. 2. Configuring the two remote services 120 and 144 to communicate with one another can be done in other ways as well, and this is indicated by block 182 in FIG. 2.

Pairing component 136 then walks user 152 through a process by which mobile computing device 104 is paired with computing device 102, if the two devices have not already been paired with one another. Pairing the two devices enables them to communicate with one another using an established connection. Pairing the two devices can be done using near field communication, but this need not be the case. Pairing can be done in other ways as well. Pairing is indicated by block 184 in FIG. 2.

Remote service 120 then communicates with mobile computing device 104 to turn on mobile remote service 144, so that it can be used by user 152. This is indicated by block 186 in FIG. 2. This can also be done by user 152 simply launching mobile remote service 144 on mobile computing device 104. In another embodiment, mobile device 104 launches mobile remote service 144 and connects to remote service 120 which is already running on computing device 102.

In one embodiment, when remote service 120 is set up on computing device 102, an add-in component 116-118 is provided for each program (e.g., for each application 124-126) that the remote service will operate on. When mobile remote service 144 is launched by user 152, remote service 120 sends application identifiers from computing device 102 to mobile computing device 104 indicating which particular programs (that have a corresponding add-in component 116-118) are open on computing device 102. In the example shown in FIG. 1, assume that add-in component 116 is provided for application 124 (which may be, for example, a word processing application, a spreadsheet application, a presentation application, a drawing application, an operating system, etc.). Assume also that add-in component 118 is provided for application 126 (which can also be one of a wide variety of different types of programs). In that case, when mobile remote service 144 is launched on mobile computing device 104, remote service 120 sends an application identifier (or another program identifier) for each program (e.g., application 124 and 126) that is currently open on computing device 102, or that has been recently used. This is indicated by block 188 in FIG. 2A. As indicated in FIG. 2, the programs can be a spreadsheet 190, a word processor 192, a presentation application 194, an operating system 196, or any of a wide variety of other programs 198.

Mobile remote service 144 then interrogates the add-ins 116-118 for each of the identified applications on computing device 102 for data structure metadata that identifies the data structure of the particular programs that have been identified. This is indicated by block 200 in FIG. 2. The interrogation communication is also indicated by block 156 in FIG. 1.

The interrogation can be performed in wide variety of different ways. For instance, each of the applications 124-126 illustratively has a set of public models that can be interrogated for their metadata. In one embodiment, the metadata identifies the type of data and the data structure in each model, and how the data looks in each model. Interrogating the public model is indicated by block 202 in FIG. 2. Of course, the interrogation can take a wide variety of other forms as well, and this is indicated by block 204.

Mobile remote service 144 illustratively receives the metadata 158 (shown in FIG. 1) that describes the structure of the data and how the various displays look, on each of the identified applications. Receiving the metadata from computing device 102 is indicated by block 206 in FIG. 2.

Display generator component 138 then generates a display 150 on the display device 142 of mobile computing device 104, that is suitable for the mobile device based on the received metadata 158. Generating the display is indicated by block 208 in FIG. 2. This can be done in a variety of different ways.

For instance, in one embodiment, the display device 142 on mobile computing device 104 is smaller than the display device 114 on computing device 102. Therefore, display generator component 138 can generate a display 150 on mobile device 104 that is different from the display 154 shown on computing device 102. As an example, because the display device 142 is relatively small, display generator component 138 may illustratively generate a display that shows only a subset of the display elements that are displayed on the display screen 114 of computing device 102. It may change the size of the display elements or the layout of the display elements or it may change the configuration of the display elements (such as by collapsing or expanding a list of elements, by changing chart displays, etc.). Deciding which display elements to display on the user interface displays 150 on mobile device 104 is indicated by block 210 in FIG. 2. Deciding on the size of the display elements is indicated by block 212, and deciding on the layout is indicated by block 214. Deciding whether to reconfigure the display elements (such as by collapsing a list of elements, etc.) is indicated by block 216. Generating the display 150 on mobile computing device 104 in other ways is indicated by block 218 in FIG. 2. A number of examples of different displays simultaneously displayed on computing device 102 and on mobile computing device 104 will be described below with respect to FIGS. 3A-3N-2.

In one embodiment, some of the information displayed on user interface displays 150 of mobile computing device 104 is control information, such as user input mechanisms, that allow user 152 to control a given application on computing device 102. Thus, user 152 can illustratively interact with the user interface displays 150 in order to control the applications 124-126 or the displays 154 generated on computing device 102, or in order to control computing device 102 in other ways. In another embodiment, the user interface displays 150 that are displayed to user 152 contain control information, but it is simply to control the user interface display 150 on mobile computing device 104, itself, and actuation of the user input mechanism does not change the display 154 on computing device 102. For instance, if the user wishes to expand the display 150 on device 104, user 152 can illustratively interact with suitable user input mechanisms on display 150 in order to do this, without necessarily affecting the operation of computing device 102, or the displays 154 generated thereon.

In any case, receiving a user interaction with the display 150 generated on mobile computing device 104 is indicated by block 220 in FIG. 2. If the user interaction can be processed locally on mobile computing device 104, without communicating information back to computing device 102, this is done, and processing reverts back to block 220. Determining whether the user interaction is to be communicated to computing device 102 is indicated by block 222. If not, performing local processing is indicated by block 224. As briefly mentioned above, the local processing can include expanding a list as indicated by block 226, or a wide variety of other local processing as indicated by block 228.

However, if, at block 222, it is determined that the user interaction with the user interface display 150 is a control input or another input that is to affect the operation of the application on computing device 102, or the user interface displays 154 displayed thereon, then mobile remote service 144 illustratively sends user interaction information to control the corresponding application on computing device 102. This is indicated by block 230 in FIG. 2.

It will be appreciated that the user interaction information sent back to computing device 102 can be a wide variety of different kinds of information. For instance, it can represent a user input from user 152 indicating that the user wishes to launch a new application on computing device 102. This is indicated by block 232. It can be a user control input indicating that user 152 wishes to control one of the applications that is currently open. This is indicated by block 234. It can be display change information indicating that user 152 wishes to change the display 154 on computing device 102. This is indicated by block 236 in FIG. 2. It can also be control information indicating that user 152 wishes to switch the application currently under focus. This is indicated by block 238 in FIG. 2. Of course, it can be a wide variety of other control information as well, and this is indicated by block 240.

Figure 3B:
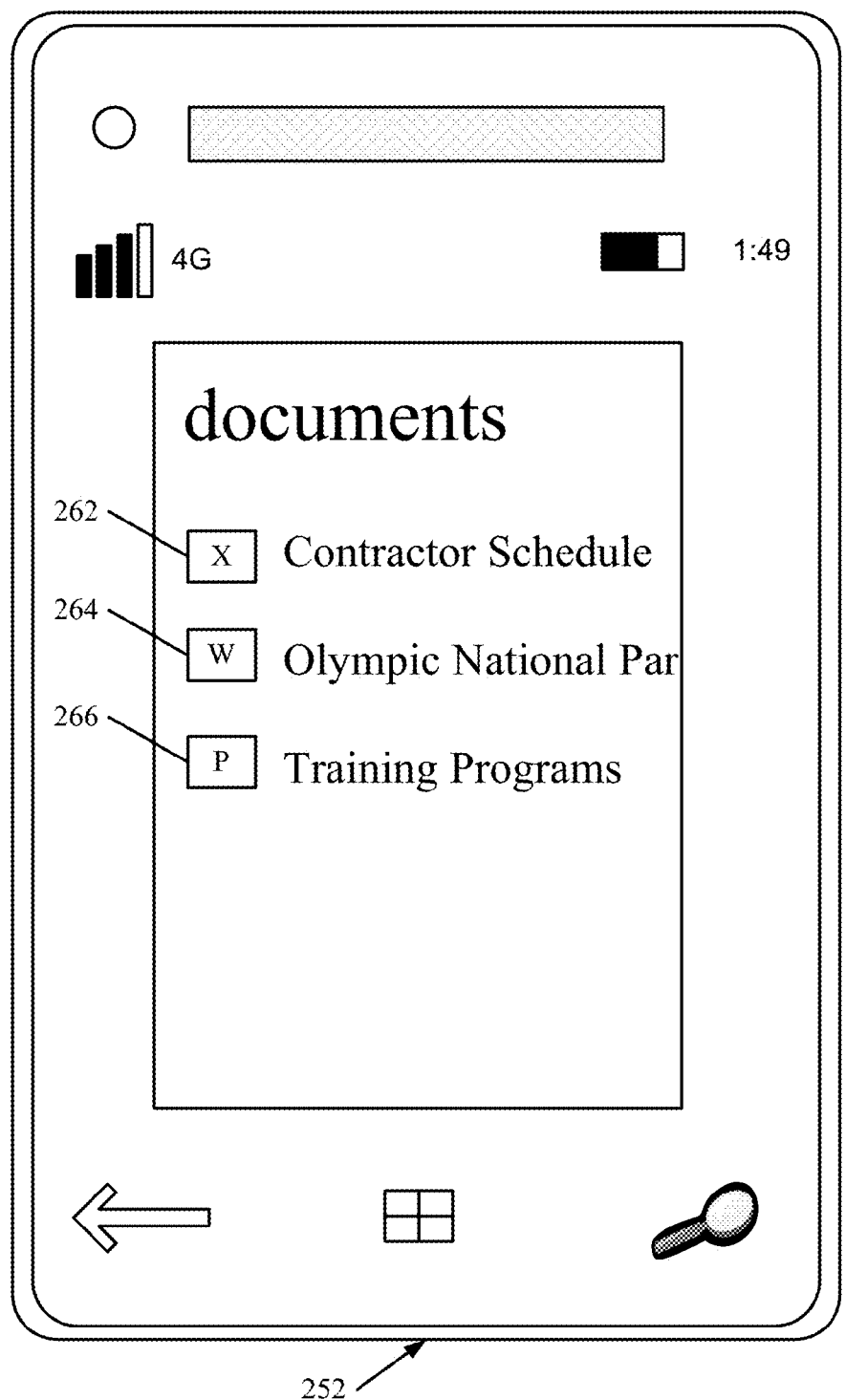

FIGS. 3A and 3B show a pair of user interface displays. User interface display 250 in FIG. 3A is illustratively shown on computing device 102, while user interface display 252 shown in FIG. 3B is illustratively (and simultaneously) displayed on mobile computing device 104. User interface display 250 shows that a set of icons 254, 256 and 258 indicate that computing device 102 has a presentation application (e.g., a slide show application) open as indicated by icon 254, a word processing application open as indicated by icon 256 and a spreadsheet application open as indicated by icon 258. User interface display 250 also shows that the presentation application is under focus, and a first slide 260 is displayed, along with a set of thumbnails 261 for the rest of the slide presentation.

User interface display 252 shows that display generator component 138 has received metadata describing the applications that are open on computing device 102, and has generated display 252 to indicate this. It can be seen that user interface display 252 includes a set of user input mechanisms that can be actuated by the user. User input mechanism 262 indicates that the spreadsheet application 258 is open on computing device 102. User input mechanism 264 indicates that the word processing application is open, and user input mechanism 266 indicates that the presentation application is open. Thus, it can be seen that display generator component 138 displays a subset of the information shown in display 250, so that user 152 can use that information to control computing device 102. In this case, the subset of information is a set of user input mechanisms, each corresponding to one of the applications that are open on computing device 102. The user can interact with display 252 in a variety of different ways, some of which will now described.

Figure 3C:
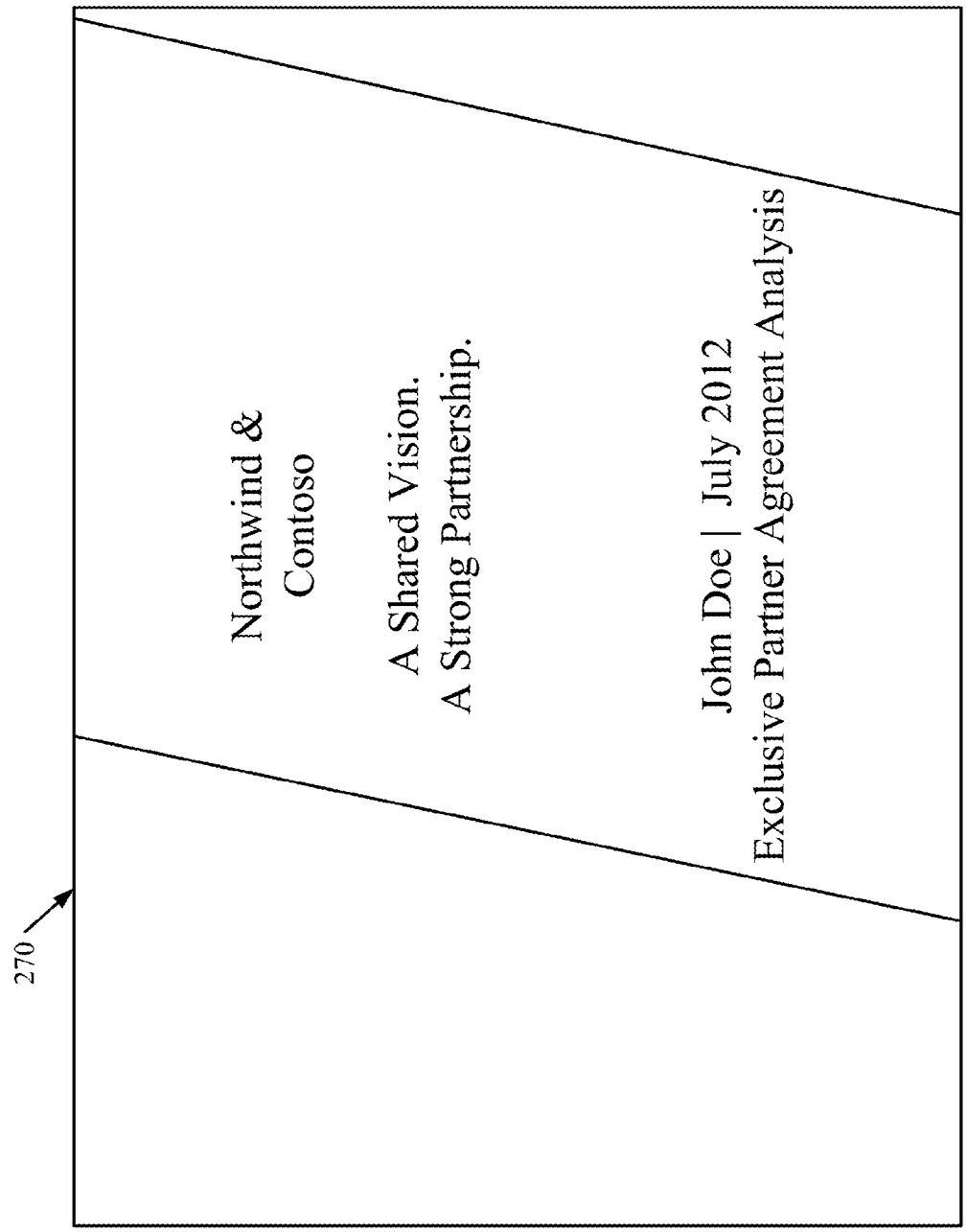
Figure 3D:
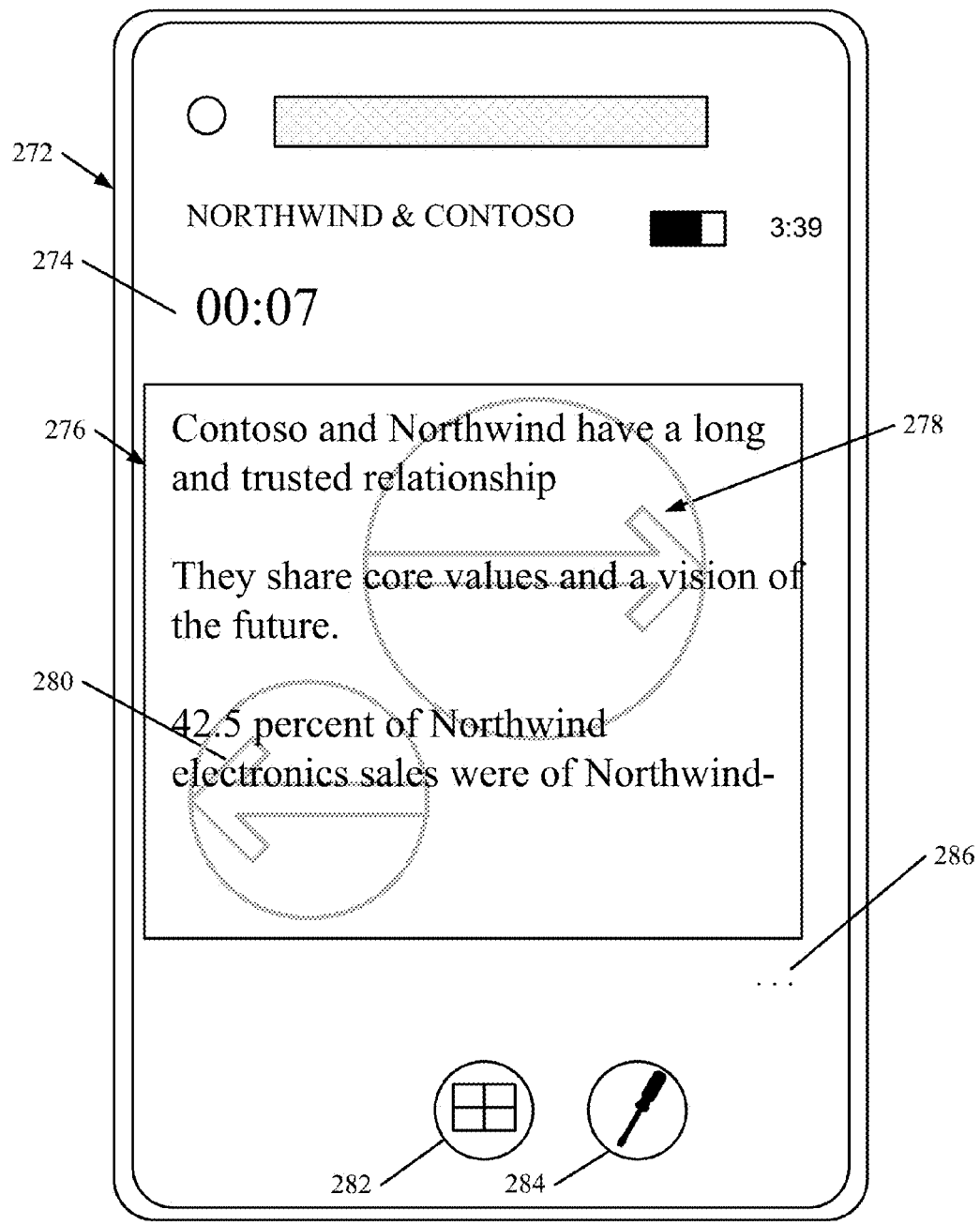

If the user actuates one of user input mechanisms 262, 264 or 266, mobile remote service 144 illustratively sends the information indicative of this back to remote service 120 in computing device 102, in order to control computing device 102. By way of example, if the user actuates user input mechanism 266, this illustratively causes remote service 120 to launch the slideshow currently open (the open document) in the presentation application. FIGS. 3C and 3D show user interface displays 270 and 272 that indicate this.

FIG. 3C shows that user interface display 270 is generated on computing device 102, when the user actuates the slideshow that is open in the presentation application. The presentation application goes into presentation mode, just as if the user had launched the slide show by interacting with display 250 on computing device 102. Thus, thumbnails 261 are eliminated and the presentation application begins with the first slide in the slide deck that was previously displayed in the thumbnail section.

At the same time, mobile remote service 104 interrogates the add-in component for the presentation application to obtain metadata indicative of the data in the slide presentation, and its structure. In response, display generator component 138 illustratively generates user interface display 272 and shows it on the display device 142 of mobile computing device 104. In the embodiment shown in FIG. 3D, display 272 illustratively includes an elapsed time indicator 274, a set of notes 276 that correspond to the slide displayed in display 270 on computing device 102, and a set of control user input mechanisms 278 and 280. The control mechanisms 278 and 280 are illustratively displayed in the background of notes 276, but are active. Therefore, if the user actuates user input mechanism 278, the slide presentation program on computing device 102 advances to the next slide. If the user actuates user input mechanism 280, the slide presentation application returns to the previous slide. The user input mechanisms 278 and 280 can be actuated in a wide variety of different ways, such as using touch gestures or otherwise. In one embodiment, the present application can also be controlled to advance to the next slide or return to the previous slide using touch gestures, such as swipe.

Display 272 also illustratively includes a set of additional controls, such as slide sorter control 282 and laser pointer control 284. Control 282 is illustratively a slide sorter user input mechanism that can be actuated by user 152 in order to view the set of thumbnails (on mobile device 104) in the open slide presentation, and skip to another slide. The presentation will then display the slide that the user skipped to on the display screen of computing device 102. In another embodiment, the user can expand the control bar by actuating another user input mechanism 286, in order to view additional information or additional controls. The additional controls that are displayed when the user actuates user input mechanism 286 on FIG. 3D can include additional control user input mechanisms such as a "first slide" user input mechanism, a "last slide" user input mechanism, a "end show" user input mechanism, a "bring to front" user input mechanism and a "settings" user input mechanism. The user can illustratively actuate those user input mechanisms to jump to the first slide or last slide of the presentation or to end the show, or to bring to the front given information. The user can actuate the settings actuator to change settings.

Figure 3E:
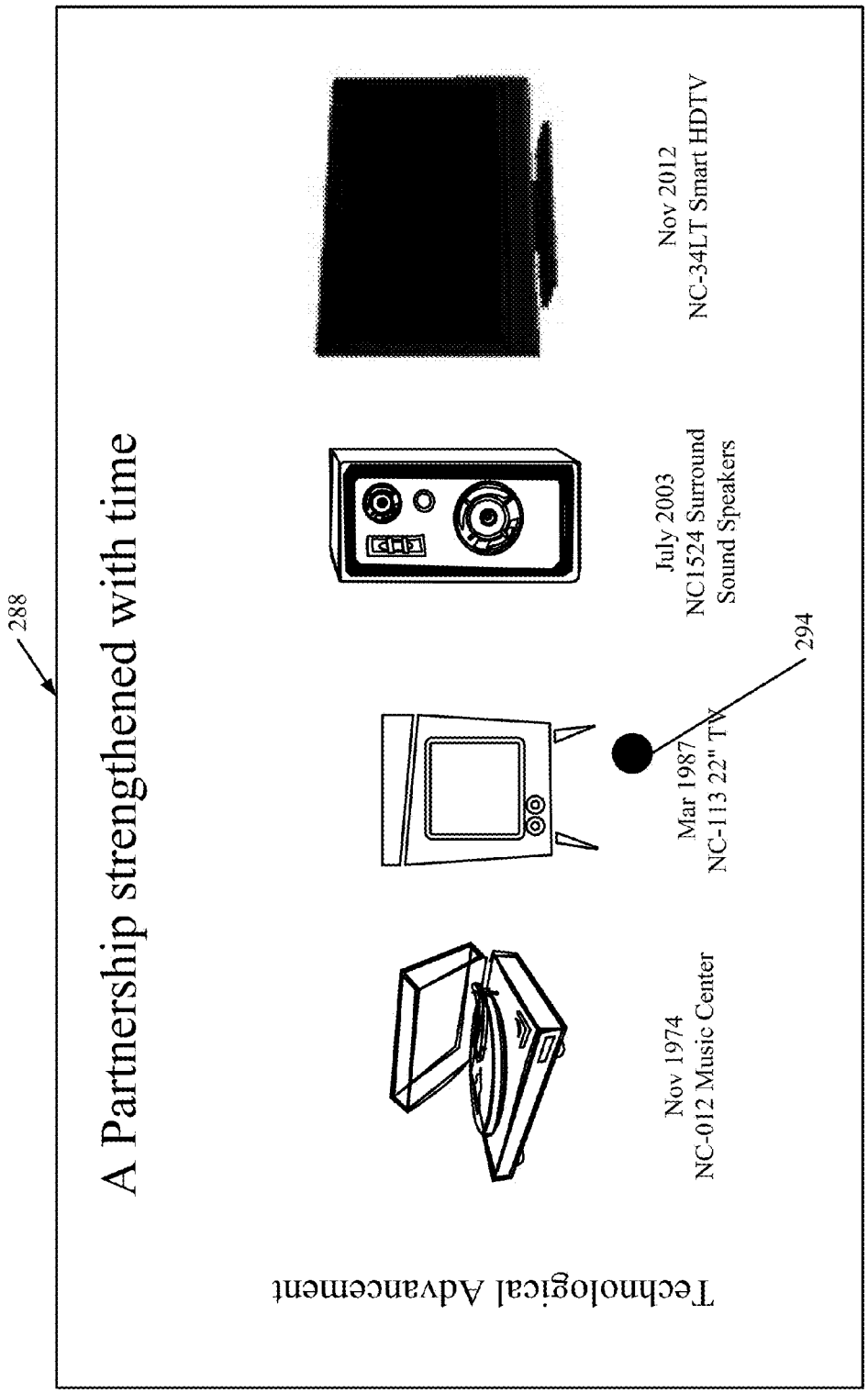
Figure 3F:
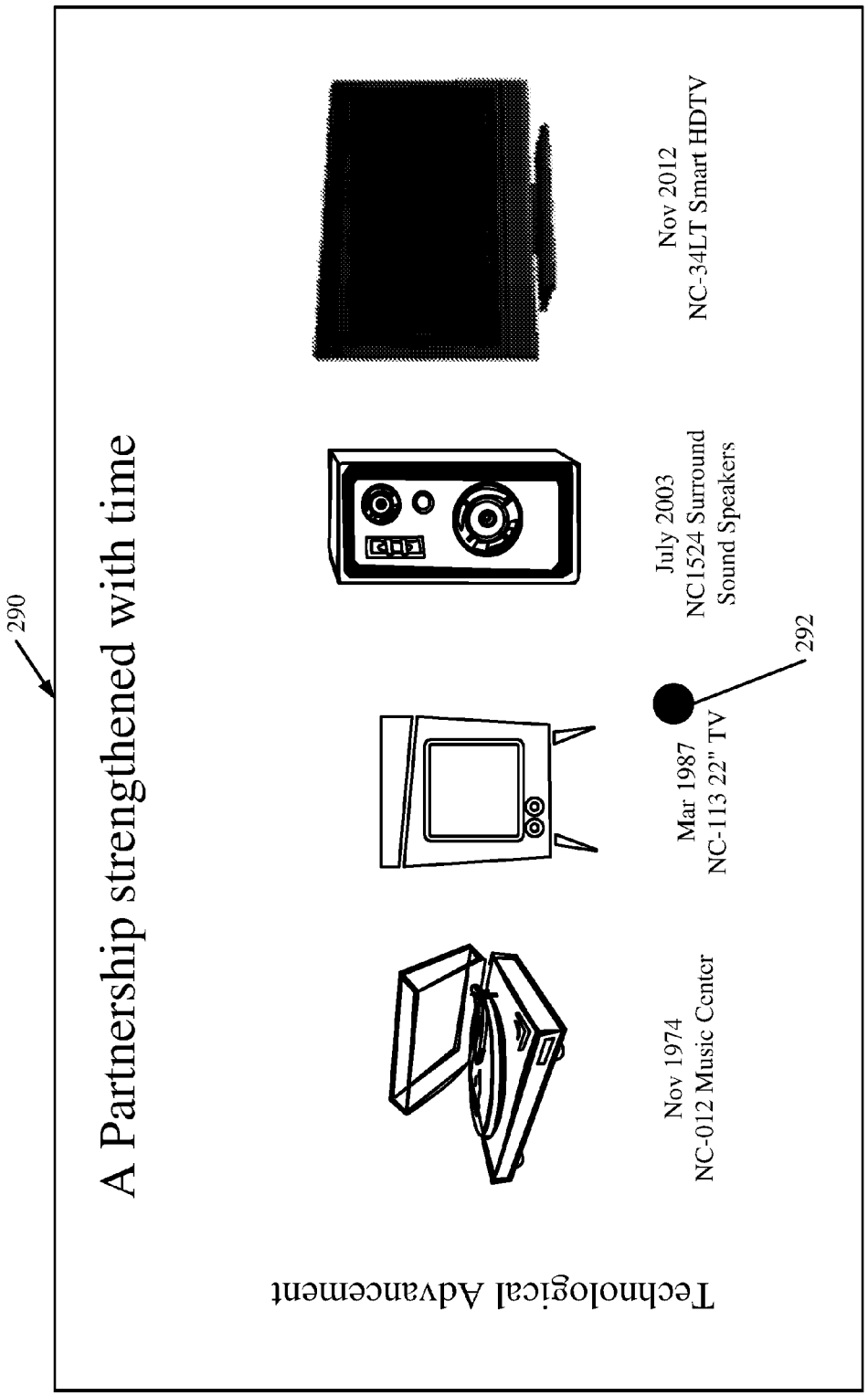

FIGS. 3E and 3F show user interface displays 288 and 290 which illustrate an example in which user 152 actuates laser pointer control 284. FIG. 3E is user interface display 288 that is shown on the display device 114 of computing device 102. FIG. 3F shows that user interface display 290 is shown, at the same time, on the display device 142 of mobile computing device 104. Circle 292 in FIG. 3F represents a spot where the user has placed his or her finger on the touch sensitive display device 142 on mobile computing device 104. FIG. 3E shows that a pointer, or cursor, or other display element 294 is correspondingly displayed on display 288 on computing device 102. As the user moves his or her finger around display 290, the pointer or cursor or other display element 294 also illustratively moves around the display 288 on computing device 102. This allows the user, for example, to make a presentation and draw the audience's attention to various items on the slide being displayed.

Figure 3G:
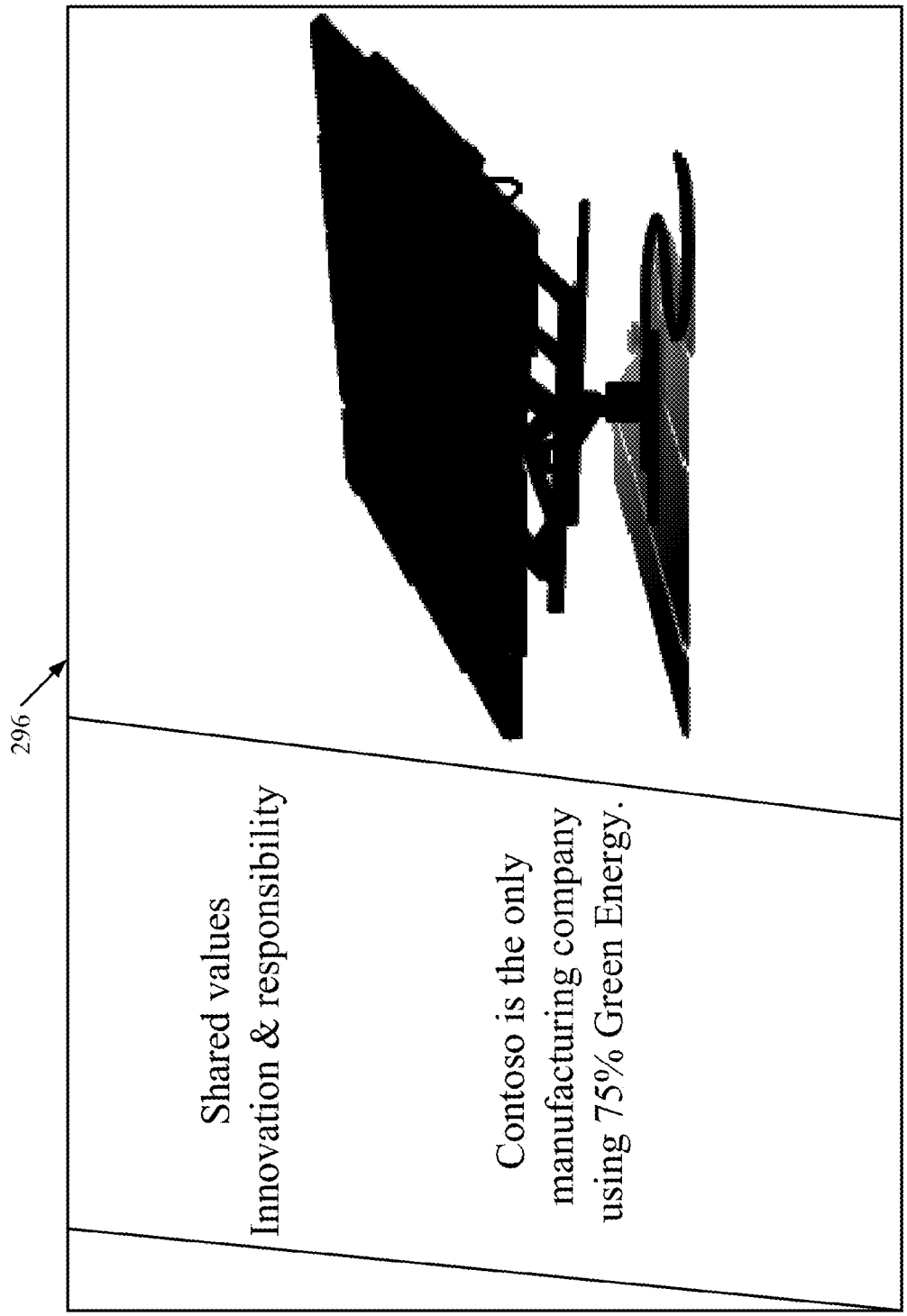
Figure 3H:
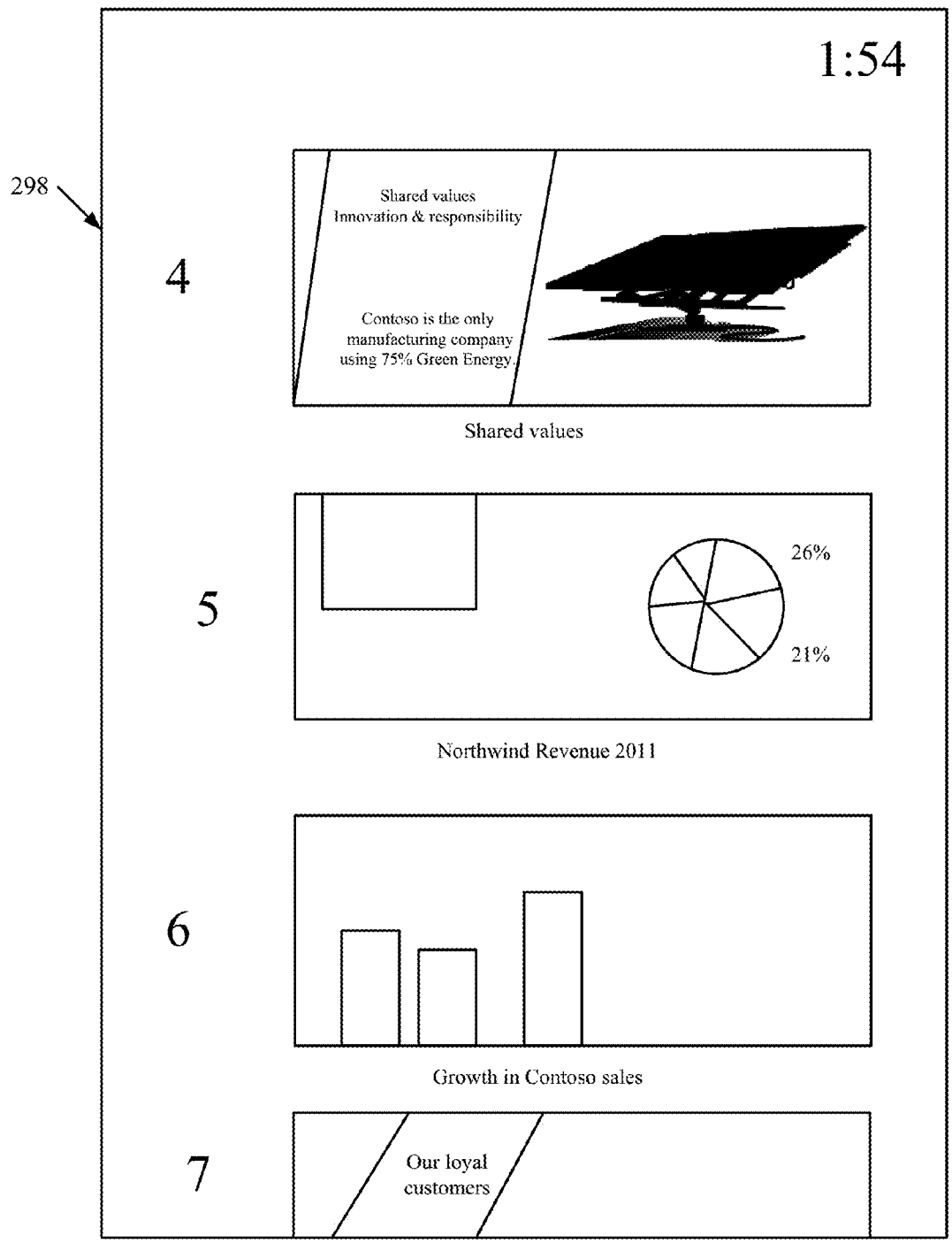

FIGS. 3G and 3H show user interface displays 296 and 298 that illustrate an example in which the user actuates the slide sorter user input mechanism 282 on the user interface display shown in FIG. 3D. FIG. 3G shows that the application on computing device 102 is now displaying the fourth slide in the slide deck that was open in the presentation application. Display 298 in FIG. 3H shows that mobile remote service 144 has interrogated remote service 120 to obtain information from the add-in component corresponding to the presentation application to receive metadata describing the slide deck thumbnail information. Thus, display generator component 138 on mobile computing device 104 can generate the display of the thumbnails shown in FIG. 3H. This allows user 152 to actuate one of the thumbnails in order to skip ahead or skip backward in the slide presentation.

Figure 3I:
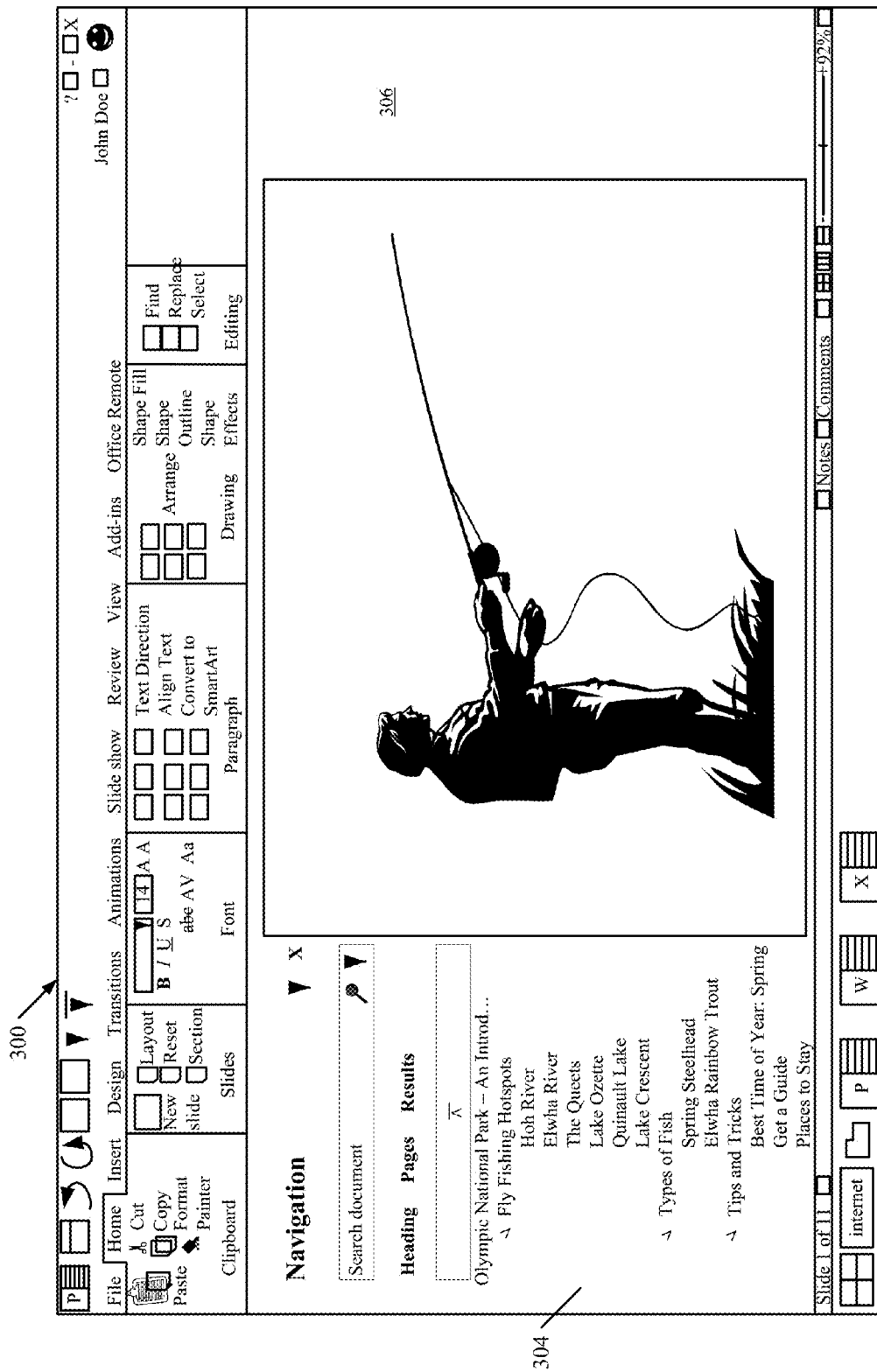
Figure 3J:
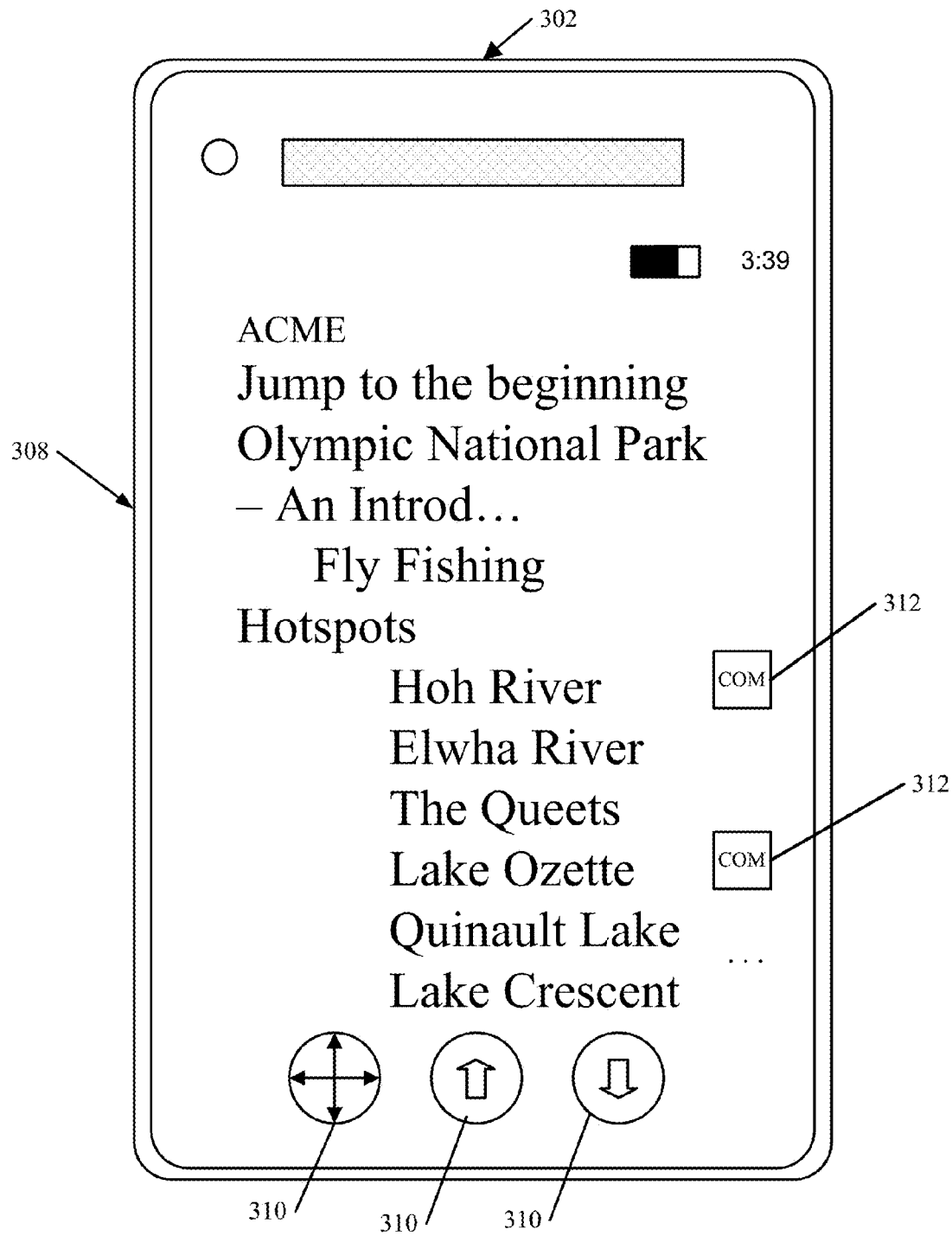
Figures 1, 3J:
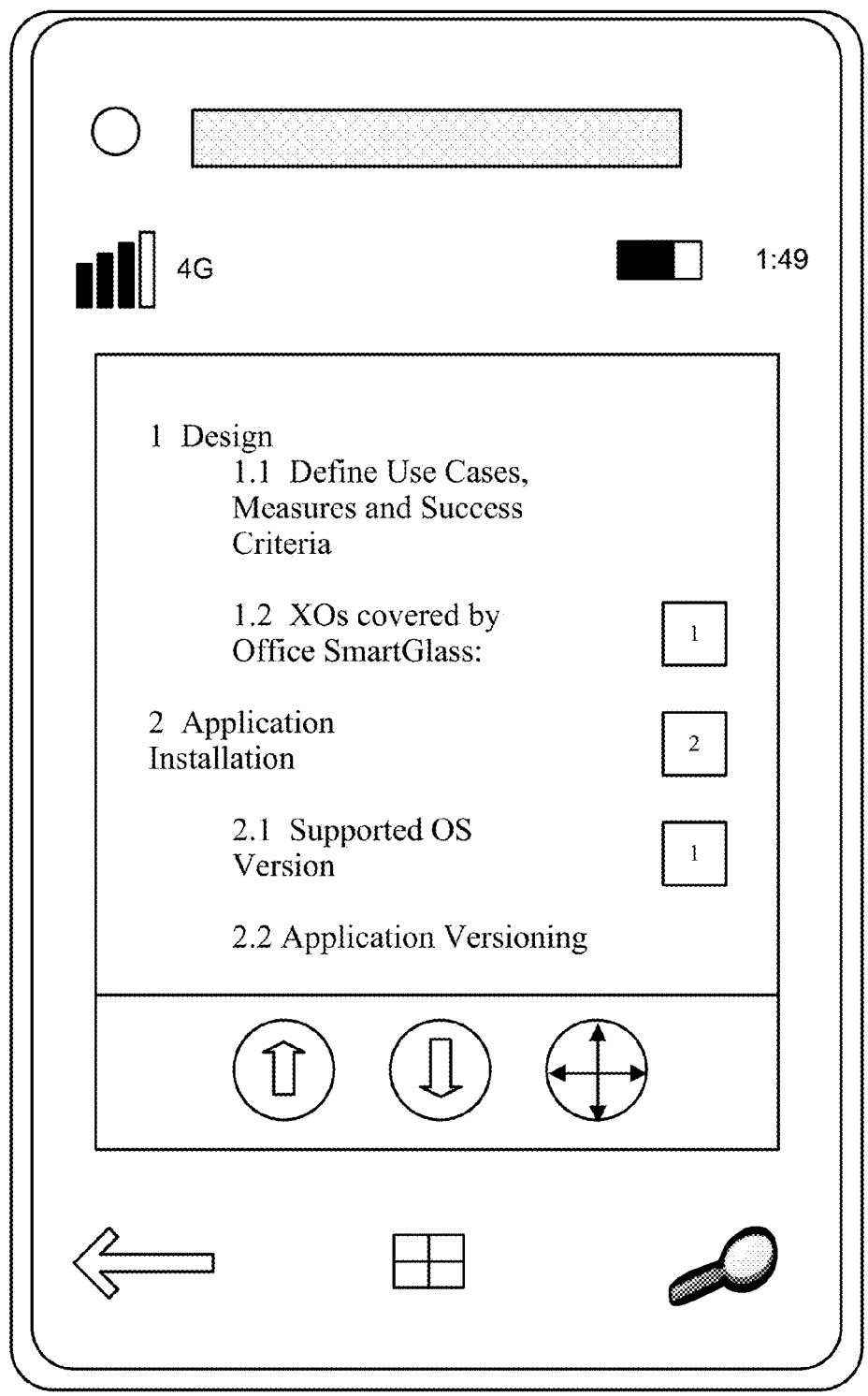
Figures 2, 3J:
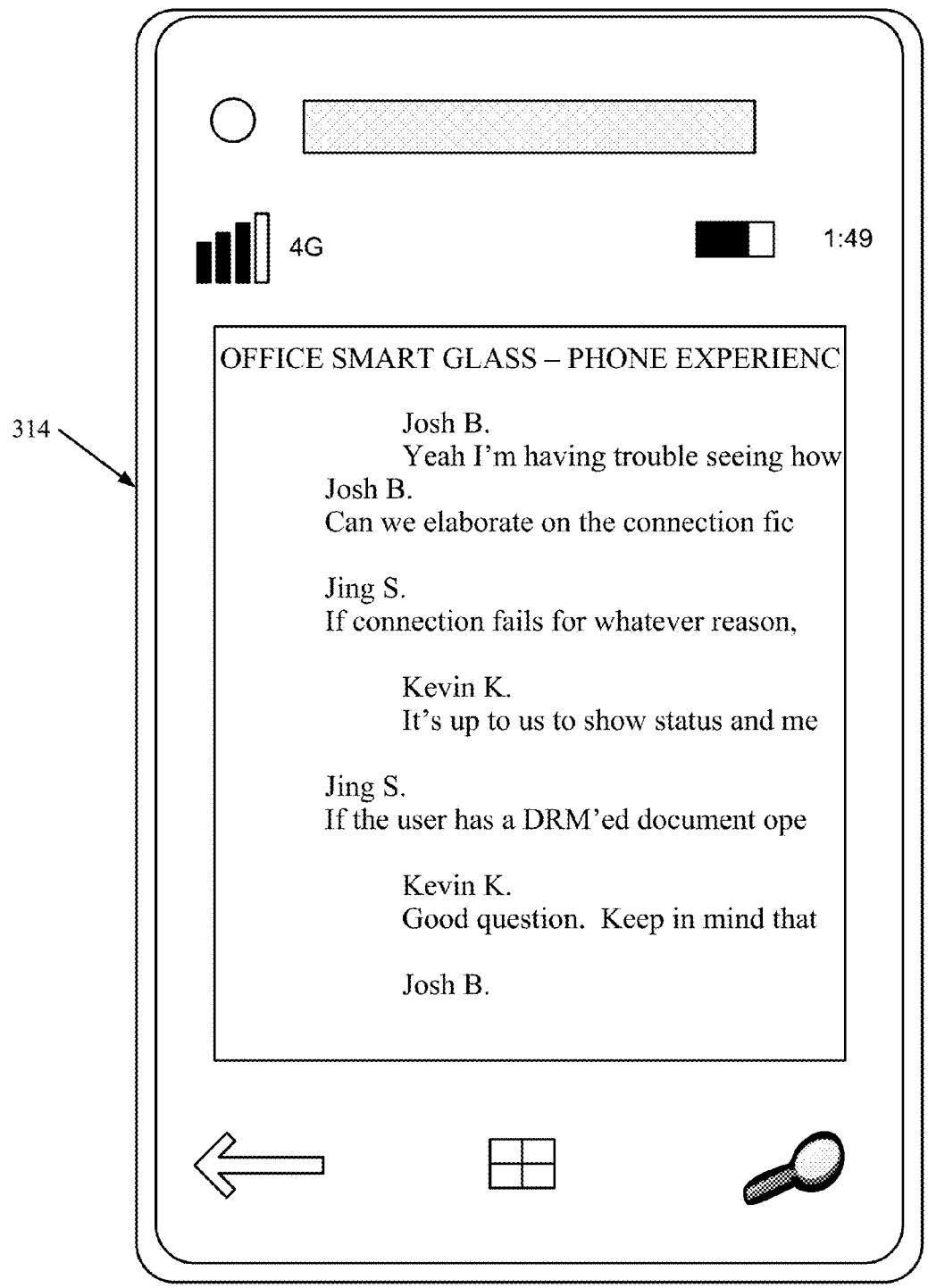

Referring again to FIG. 3B, assume that the user interacts with display 252 by actuating user input mechanism 264, that corresponds to the word processing application. FIGS. 3I and 3J show examples of user interface displays 300 and 302 that can be displayed. It can be seen, for instance, that user interface display 300 shows a display generated by a word processing application on computing device 102. User interface display 302 can be simultaneously shown on the display device 142 of mobile computing device 104.

Display 300 illustratively includes a navigation pane 304 that includes an outline of hierarchically arranged nodes representing headings and subheadings that correspond to sections and subsections within the document displayed in document pane 306. By actuating any of the nodes in navigation pane 304, the user can illustratively skip to the corresponding section of the document shown in pane 306.

Display 302 that is displayed on mobile device 104 illustratively includes display elements 308 arranged in a hierarchical tree, that correspond to the section and subsection nodes shown in navigation pane 304. Display 302 also illustratively includes a set of controls 310 that allow the user to navigate through the navigation elements displayed at 308.

FIG. 3J-1 shows that, in one embodiment, the nodes in the hierarchical tree shown in navigation pane 304 correspond to headings within the document. In another embodiment, each of the nodes in the hierarchical tree can have numbers and can also illustratively have display elements 312 that correspond to notes or comments within the document. In one embodiment, display elements 312 are not only located proximate the heading or subheading that contains the notes or comments, but they also illustratively include a numerical indicator that shows how many notes or comments are in that section or subsection. By touching user input mechanisms 312, display generator component 138 illustratively expands the comments so that they are displayed. FIG. 3J-2 shows one embodiment of a user interface display 314 with comments expanded. The user can then touch the displayed comment to have display 154 on computing device 102 jump to that section of the document which contains the comments.

Figures 3, 3J:
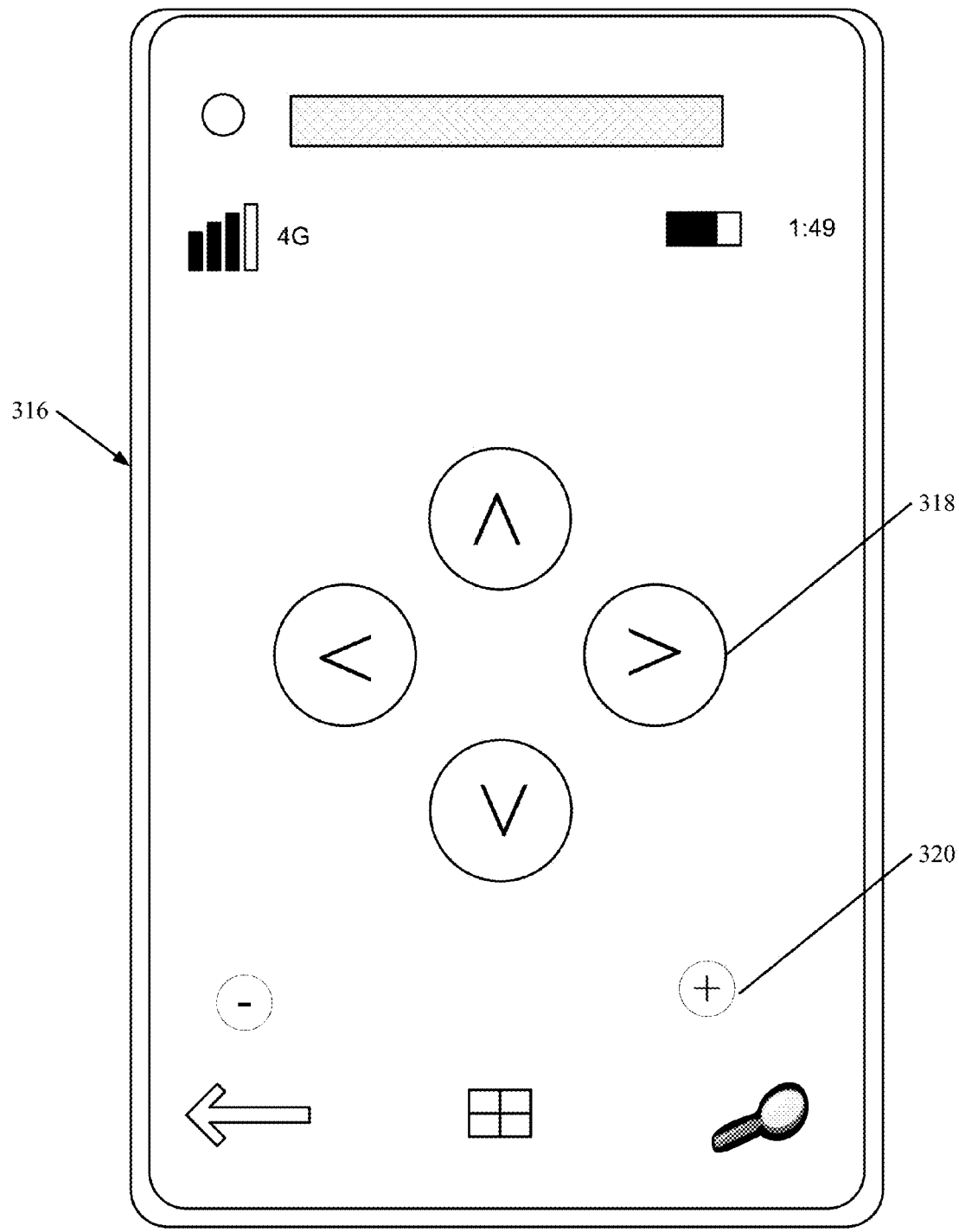

FIG. 3J-3 shows another embodiment of a user interface display 316 that shows alternate controls that can be displayed on mobile computing device 104 that allow the user to scroll through pages or change the zoom level of the display on computing device 102. The arrows 318 allow the user to scroll upward and downward, or right to left, within the document. The plus and minus mechanisms 320 illustratively allow the user to change the zoom level of the document, as it is displayed on displays 154 of computing device 102.

Figure 3K:
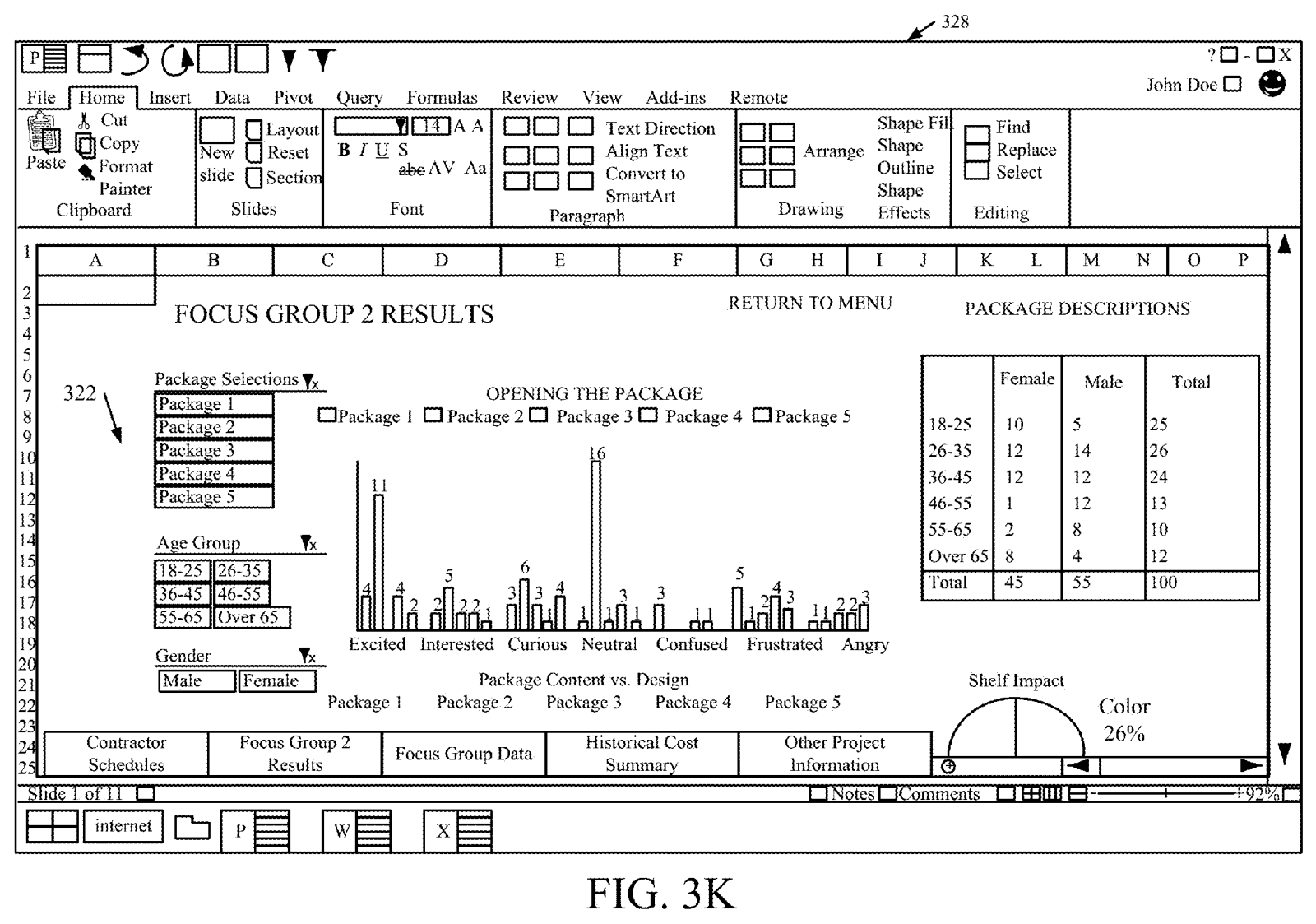
Figure 3L:
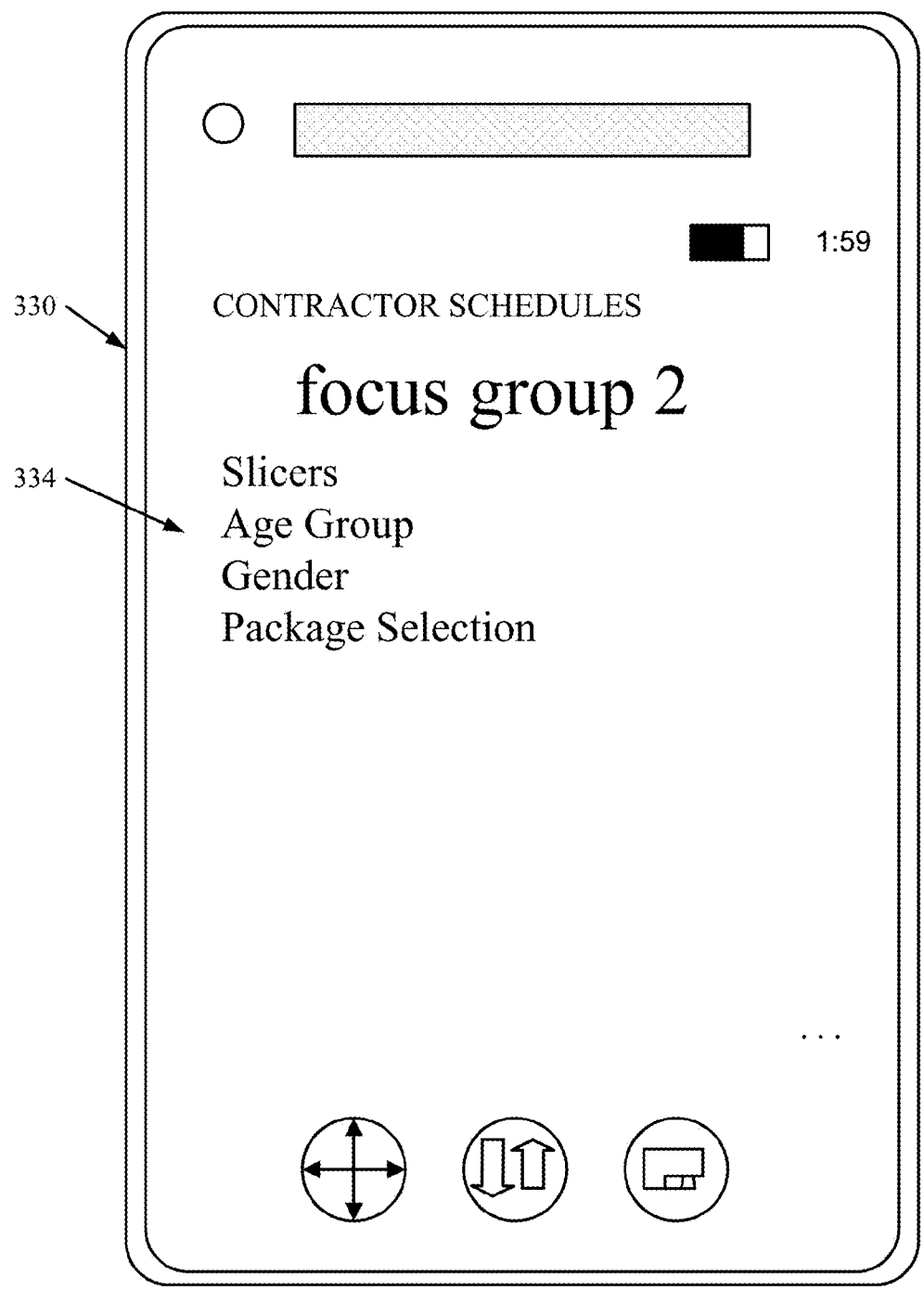
Figure 3M:
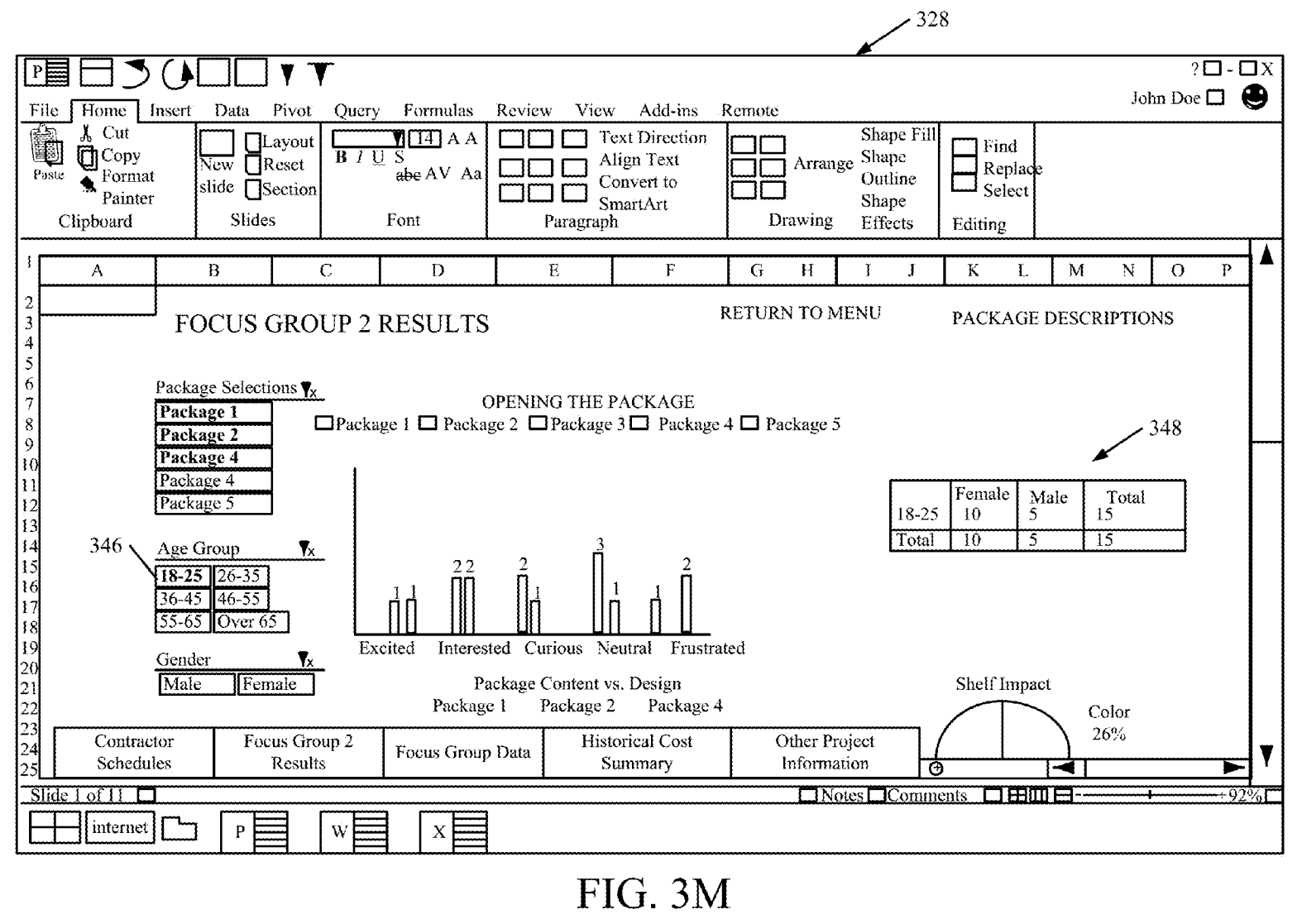
Figure 3N:
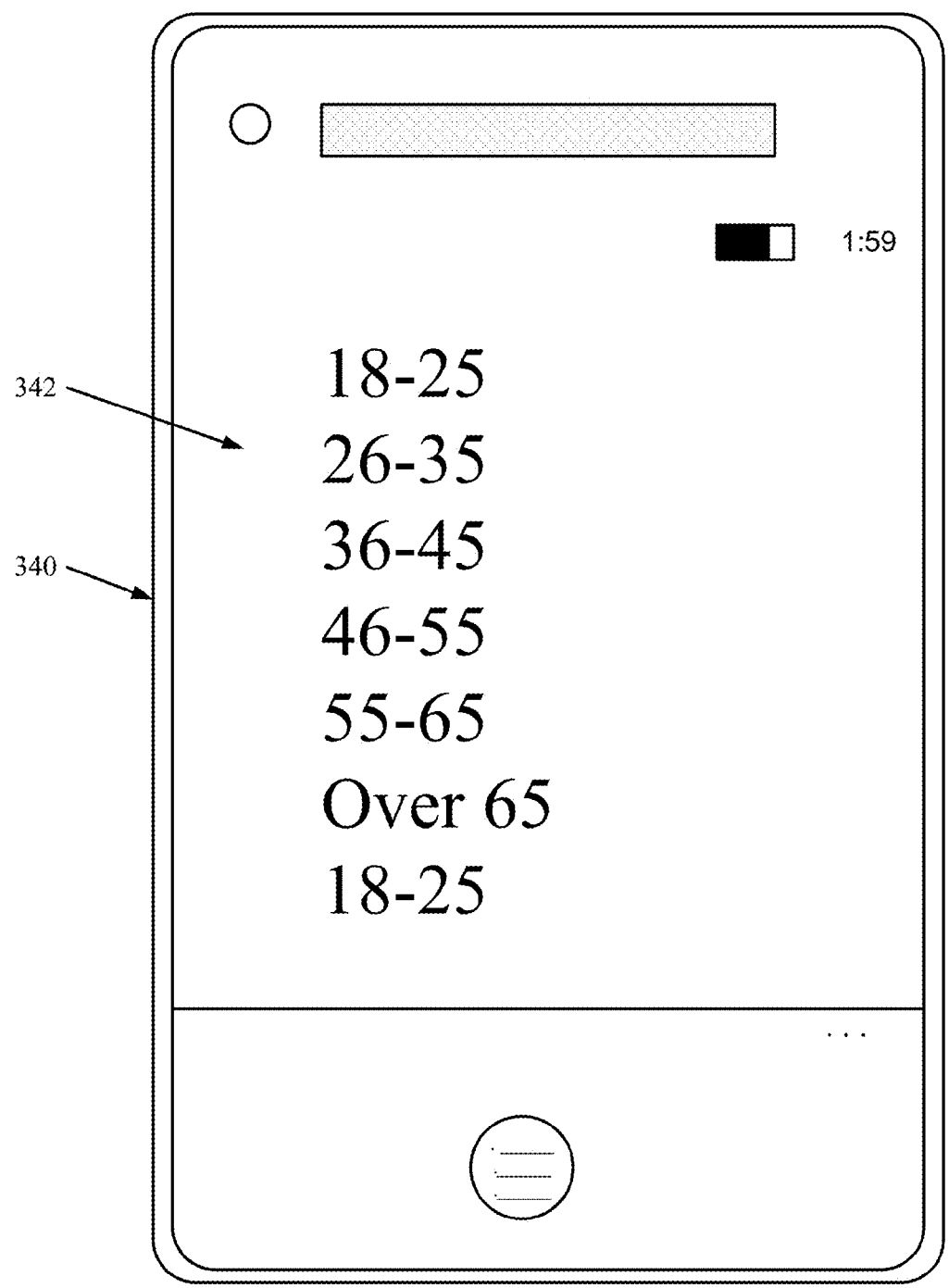
Figures 1, 3N:
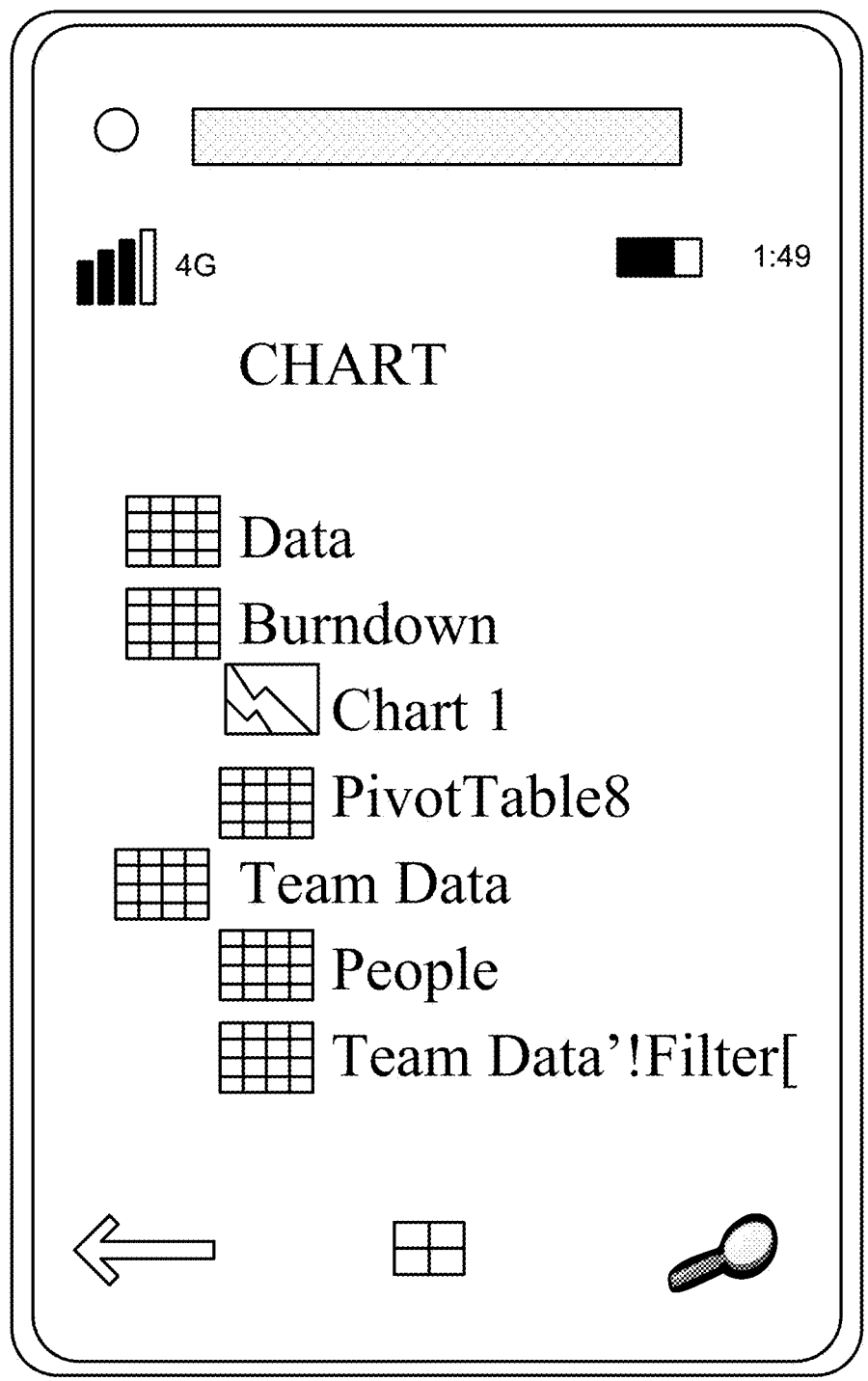
Figures 2, 3N:
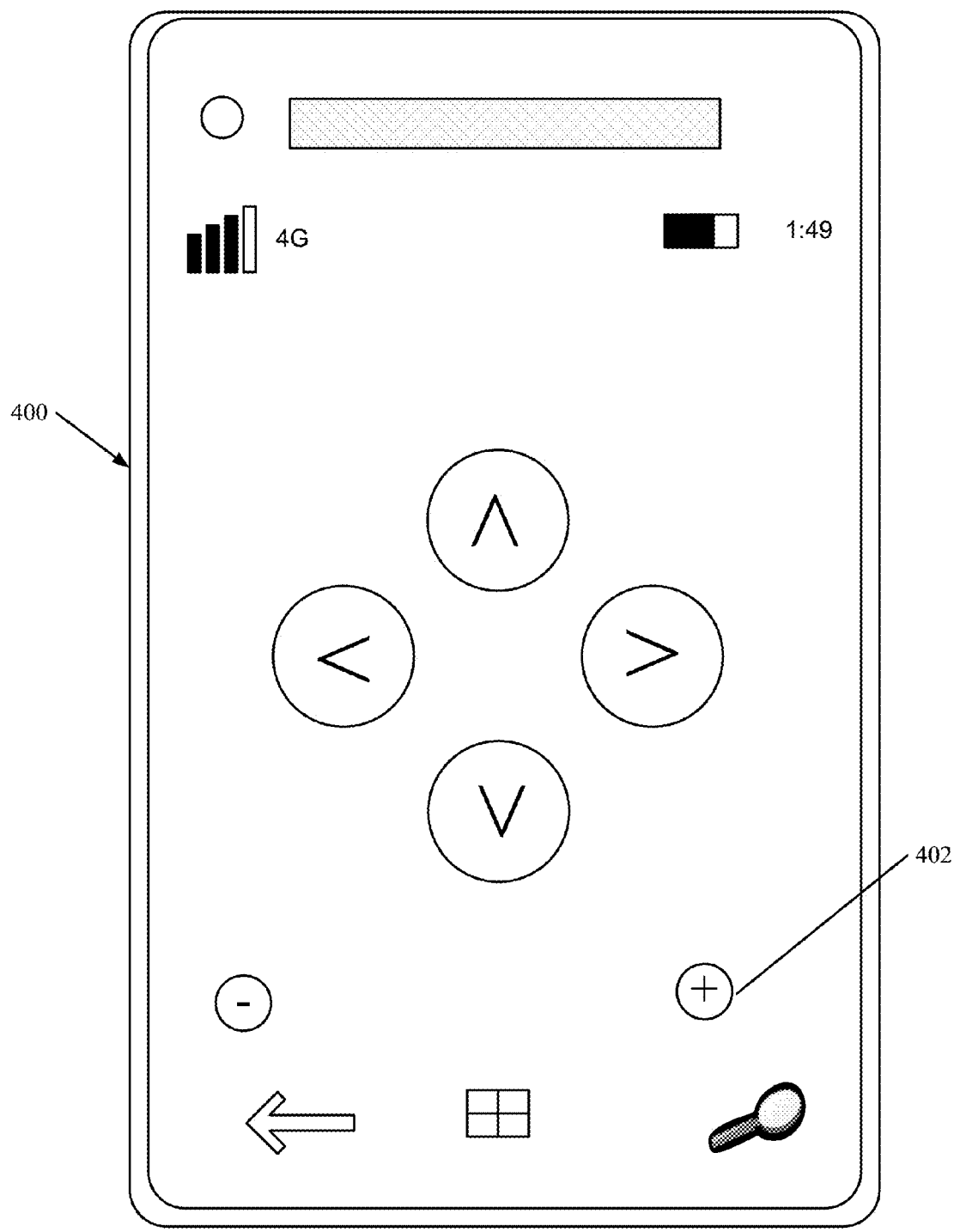

Returning again to the user interface display 252 shown in FIG. 3B, the user can also illustratively touch the user input mechanism 262 corresponding to the spreadsheet application on computing device 102. FIGS. 3K and 3L show user interface displays 328 and 330 that can be displayed when the user does this. In one embodiment, user interface display 328 is shown on the display device 114 of computing device 102, and user interface display 330 is shown on the display device 142 of mobile computing device 104. It can be seen that the spreadsheet application is displaying a page on computing device 102 that has a set of slicers shown generally at 332. The slicers illustratively allow the data to be partitioned by package selection, age group and gender.

Based upon the metadata corresponding to display 328 in FIG. 3K, display generator component 138, illustratively generates the display 330 shown in FIG. 3L, for display on the display device 142 of the mobile computing device 104. It can be seen that, instead of displaying all of the individually selectable slicers, they are displayed as a collapsed list 334. Thus, only the individual sections of slicers ("age group", "gender", and "package selection") are displayed. When the user wishes to manipulate the data shown on computing device 102, the user can illustratively select one of the slicers in collapsed list 334 to see a full list of slicers under each list element. By way of example, if the user actuates the "age group" user input mechanism in collapsed list 334, display generator component 138 illustratively displays an expanded list of "age group" slicers as shown in the user interface display 340 in FIG. 3N. The expanded list 342, shown in display 340, illustratively includes a separate user input mechanism for each of the "age group" slicers.

If the user actuates one of them, this controls the spreadsheet application display shown on computing device 102 so that the data is sliced according to the actuated user input mechanism. By way of example, if the user actuates the "18-25" user input mechanism in FIG. 3N, then mobile remote service 144 illustratively sends display control information back to computing device 102 so that it controls the spreadsheet to operate as if the "18-25" age group slicer was actuated on computing device 102. FIG. 3M shows one embodiment of a user interface display 344 that indicates this. It can be seen that display 344 has been updated to display information indicating that the particular 18-25 age group slicer 346 has been actuated, and the information illustrated generally at 348 is presented based upon that actuation.

Slicers are only one example of how the spreadsheet application on computing device 102 can be controlled from mobile device 104. In another embodiment, other functionality is also provided for the spreadsheet application. For instance, in one embodiment, the user can simply swipe the screen on device 104 to the left or to the right in order to change the sheet that is displayed in the spreadsheet application on computing device 102. The user can also illustratively change data displayed on computing device 102, in real time, such as by manipulating other slicers, pivot tables and pivot charts, etc. The user can also illustratively quickly sort in alphabetical order (or reverse alphabetical order) any filterable column, and the user can also filter and drill into the data corresponding to filterable columns.

Further, the user can illustratively jump to objects across different sheets in the spreadsheet application. For example, FIG. 3N-1 shows one embodiment of a list of objects in an entire workbook. The workbook name is "charts", in this example. The display can be generated by display generator component 138 on mobile computing device 104. The objects in the list can be selected by the user to navigate among all named objects within that spreadsheet application being displayed, across all sheets in the application. If the user selects one of the nodes in the list shown in FIG. 3N-1, this illustratively causes mobile remote service 144 to communicate display control information back to remote service 120 on computing device 102, so that computing device 102 jumps to the selected object and sets a zoom on that object. Of course, other mechanisms for jumping to various objects across sheets in the spreadsheet application can be used as well.

FIG. 3N-2 shows another embodiment in which the user can illustratively control pan and zoom on a sheet, or across sheets, within a spreadsheet application. The arrows shown generally at 400 allow the user to select a row and column, and move among rows and columns, within the spreadsheet. The plus and minus user input mechanisms 402 allow the user to adjust the zoom level displayed on computing device 102.

It can thus be seen that mobile remote service 144 enables relatively simple remote control of various documents and programs on computing device 102. The control allows navigation within various applications. It also allows easy application switching and bringing into focus a particular document, or place within a document, from mobile computing device 104. The user interface displays generated by display generator component 138 allow the user to remotely manipulate simple or complex data displayed on a much larger display for audience consumption (such as pivot table filtering in real time). It also allows using a touch screen display on mobile computing device 104 to provide visual indicators on a larger non-touch screen display (such on computing device 102). It enables pan and zoom control relative to a document on a large display, but controlled by a smaller, and more maneuverable hand-held computing device display. User 152 can also launch various documents, applications, or programs on computing device 102, using mobile computing device 104. For instance, during a presentation, user 152 may be asked a question about a related subject matter. User 152 can launch a separate presentation, and navigate through that application or presentation (as it is being displayed on the computing device 102 for the audience) in order to answer the question. This can all illustratively be done from mobile computing device 104.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
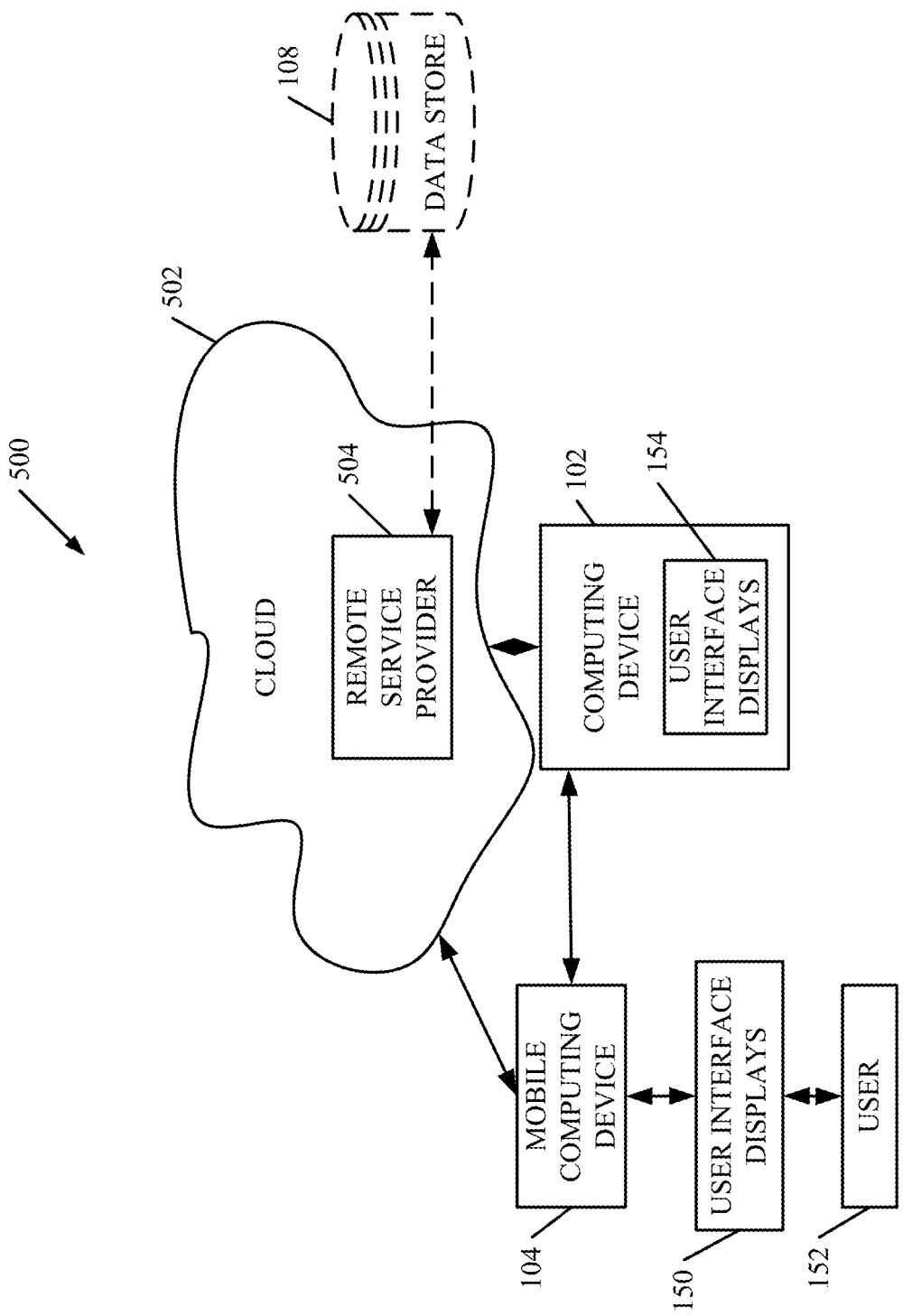
FIG. 4 is a block diagram of one illustrative embodiment of the architecture shown in FIG. 1, but displayed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 4, some items are similar to those shown in FIG. 1 and they are similarly numbered. FIG. 4 specifically shows that a mobile remote service provider 504 can be located in cloud 502 (which can be public, private, or a combination where portions are public while others are private). Therefore, user 152 uses mobile device 104 to access those systems through cloud 502 to download service 144. Other processing can also be performed in cloud 502.

FIG. 4 also depicts another embodiment of a cloud architecture. FIG. 4 shows that it is also contemplated that some elements of architecture 100 can be disposed in cloud 502 while others are not. By way of example, data store 108 can be disposed outside of cloud 502, and accessed through cloud 502. Regardless of where they are located, they can be accessed directly by devices 102 and 104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
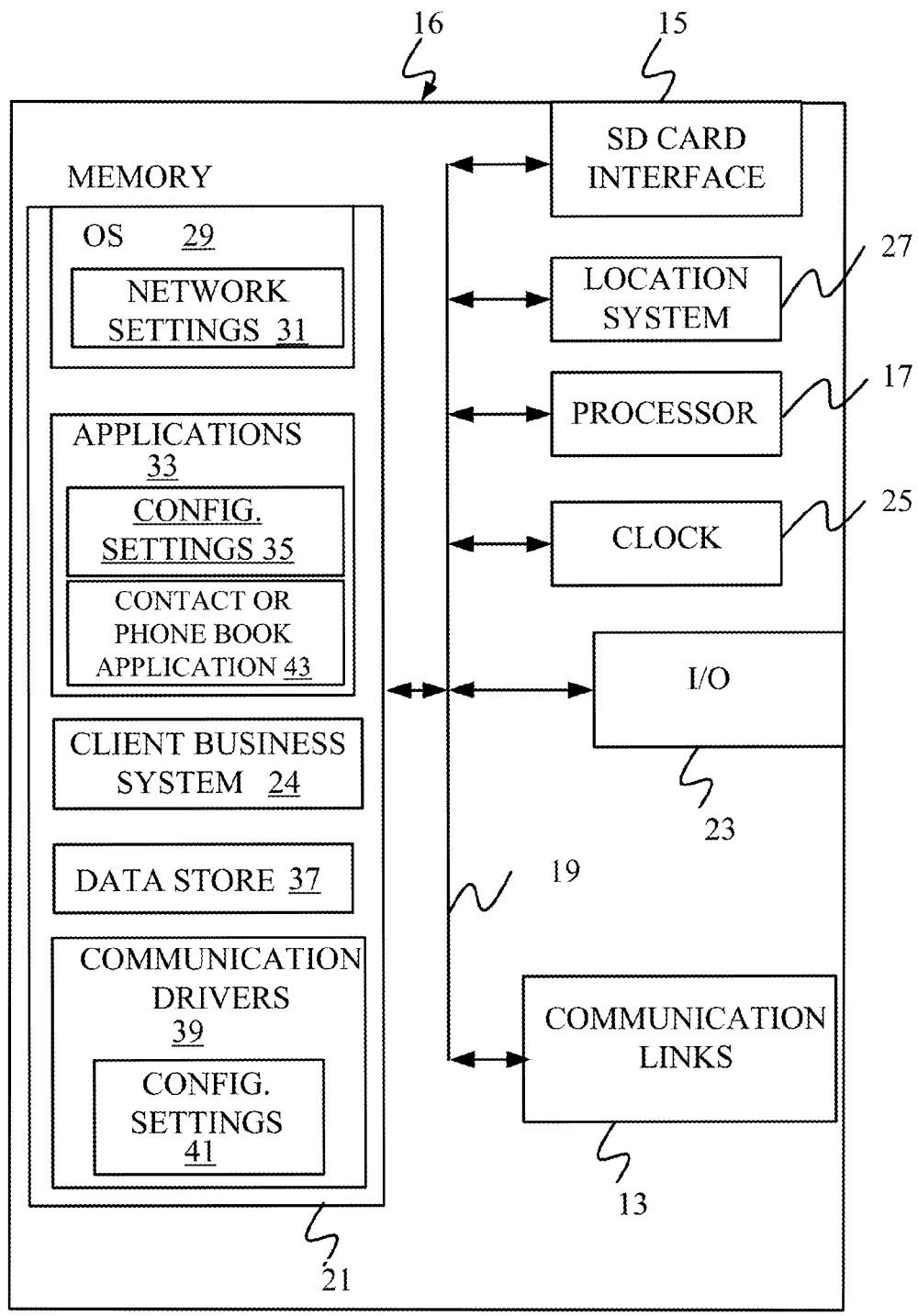
FIGS. 5-10 show various embodiments of mobile devices.

FIG. 5 is a simplified block diagram of one illustrative embodiment of a handheld or mobile computing device 16 (which can comprise mobile computing device 104 in FIGS. 1 and 4), in which the present system (or parts of it) can be deployed. FIGS. 6-10 are examples of handheld or mobile devices.

FIG. 5 provides a general block diagram of the components of a client device 16 that can run components of mobile device 104 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 132 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores client business system 24, operating system 29, network settings 31, applications 33, application configuration settings 35, data store 37, communication drivers 39, communication configuration settings 41, and contact or phone book application 43. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
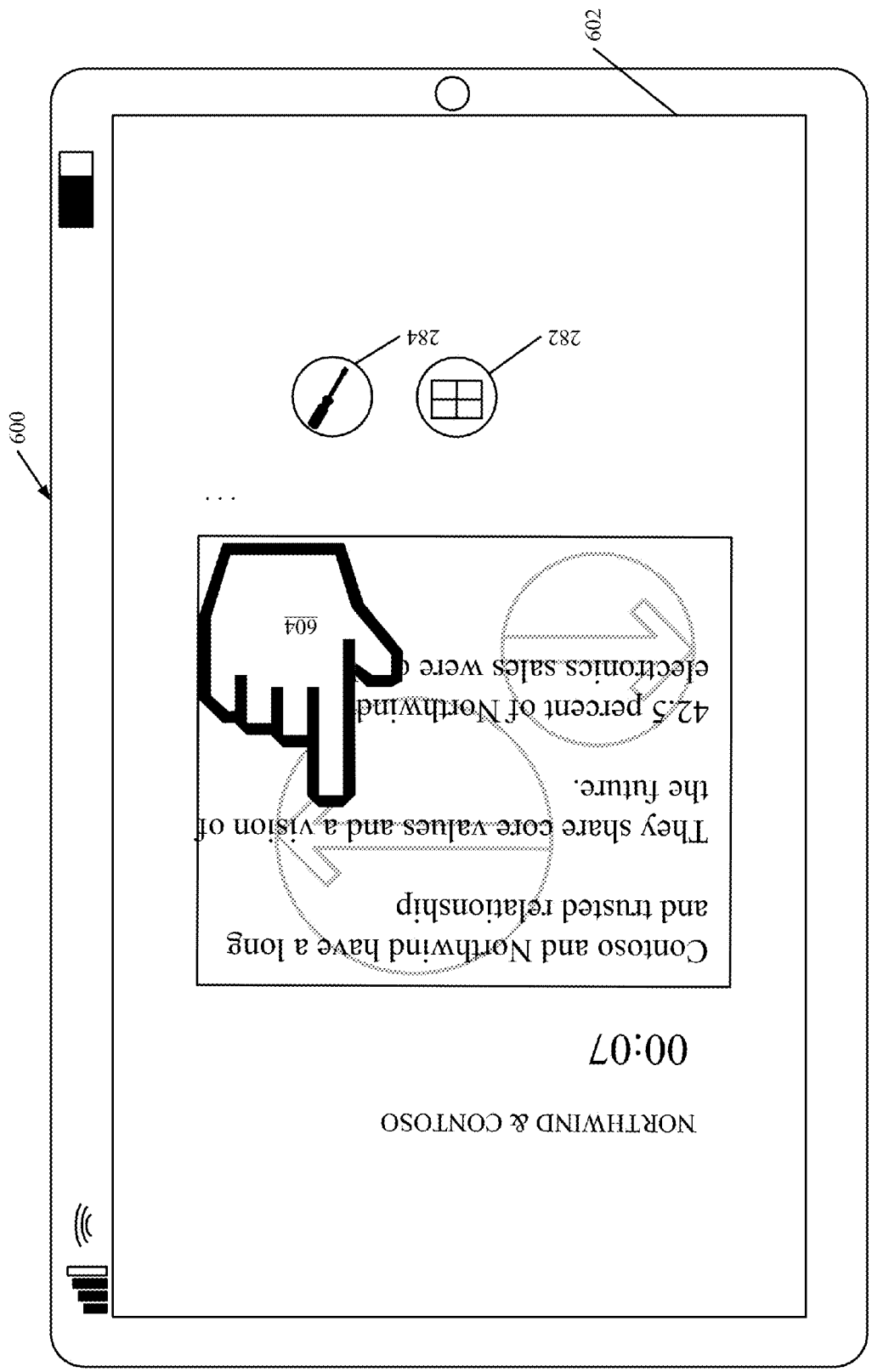

FIG. 6 shows one embodiment in which device 16 is a tablet computer 600. In FIG. 6, computer 600 is shown with user interface from FIG. 3D displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 7:
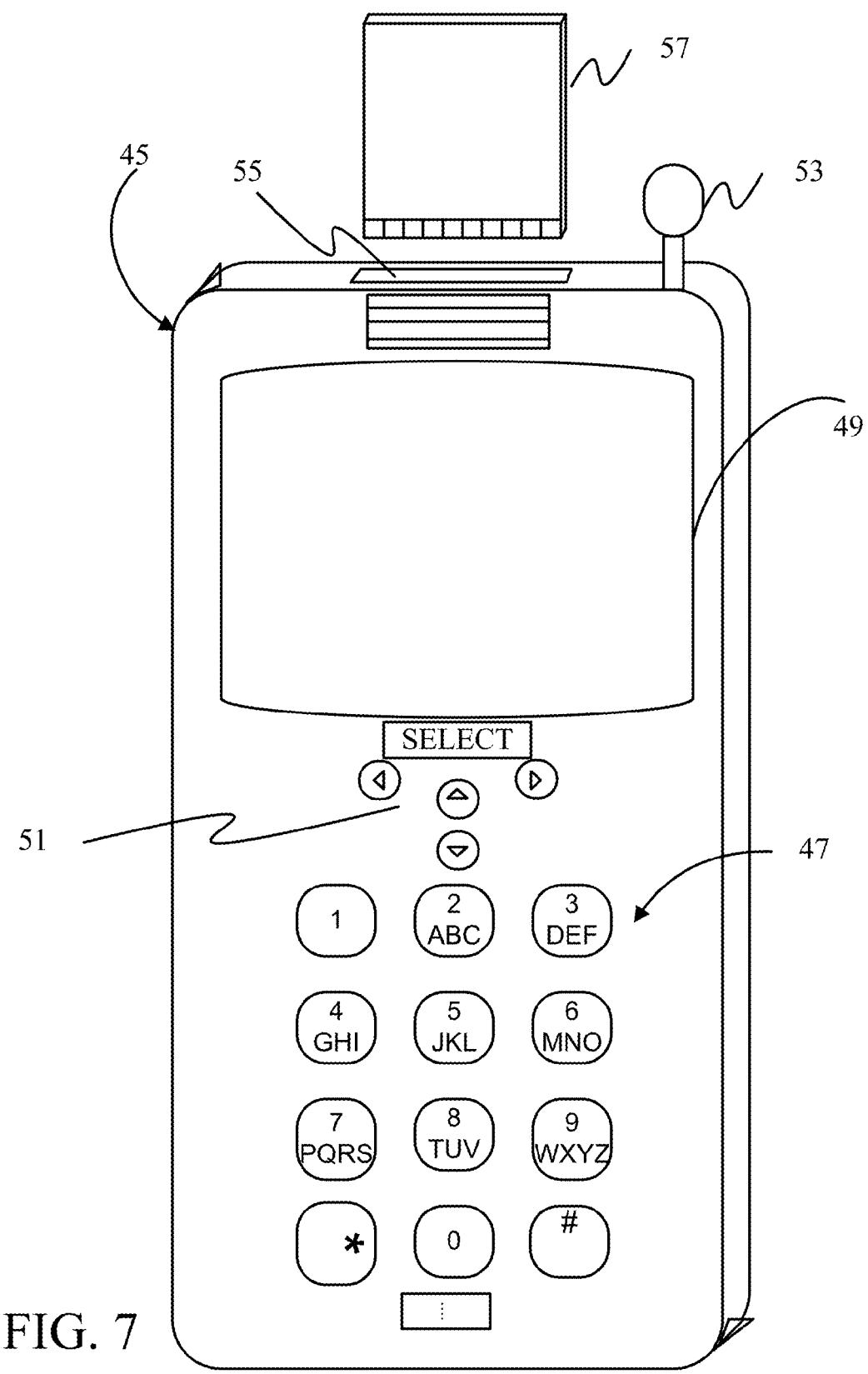
Figure 8:
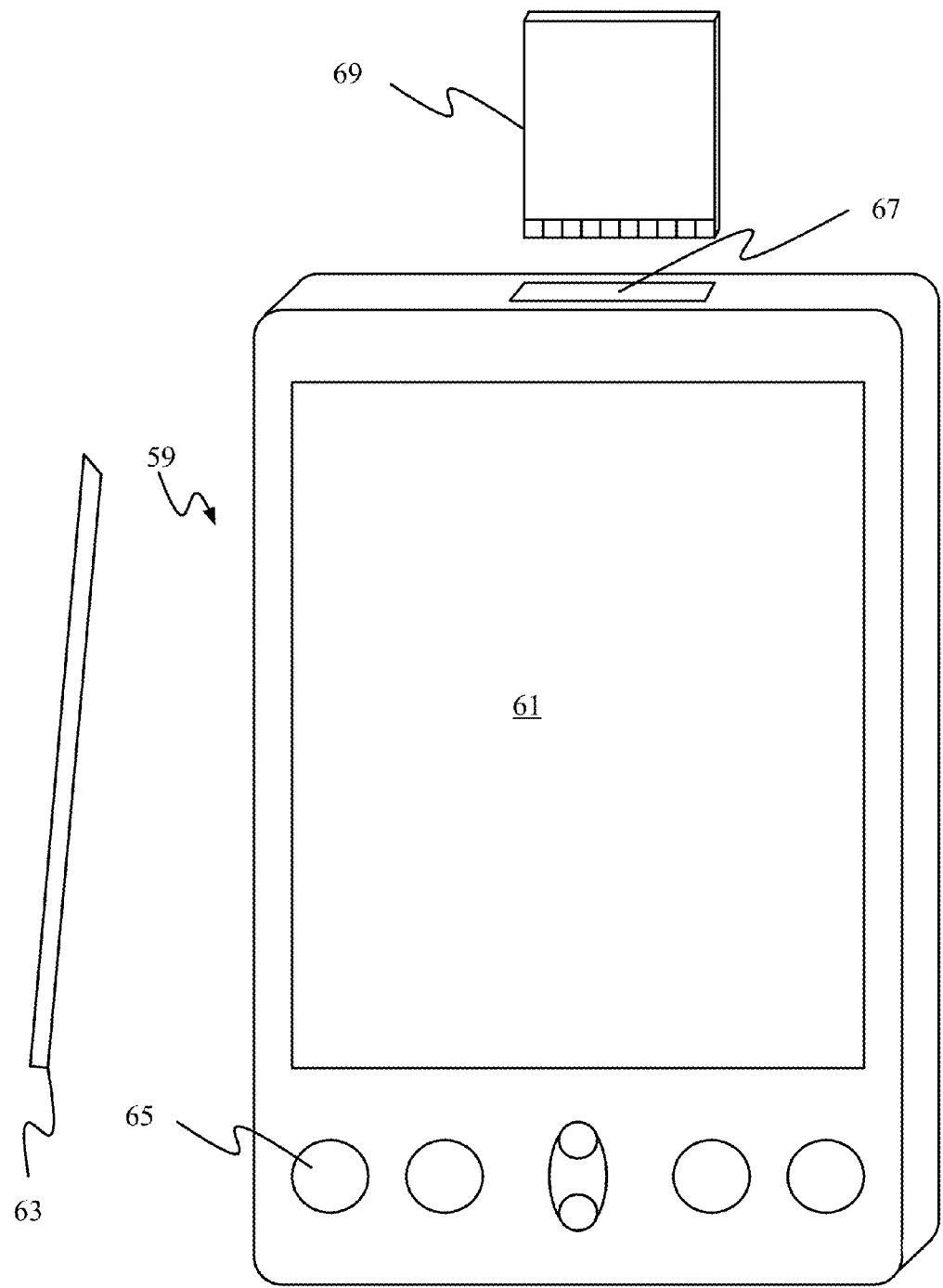

FIGS. 7 and 8 provide additional examples of devices 16 that can be used, although others can be used as well. In FIG.

7, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 8 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 9:
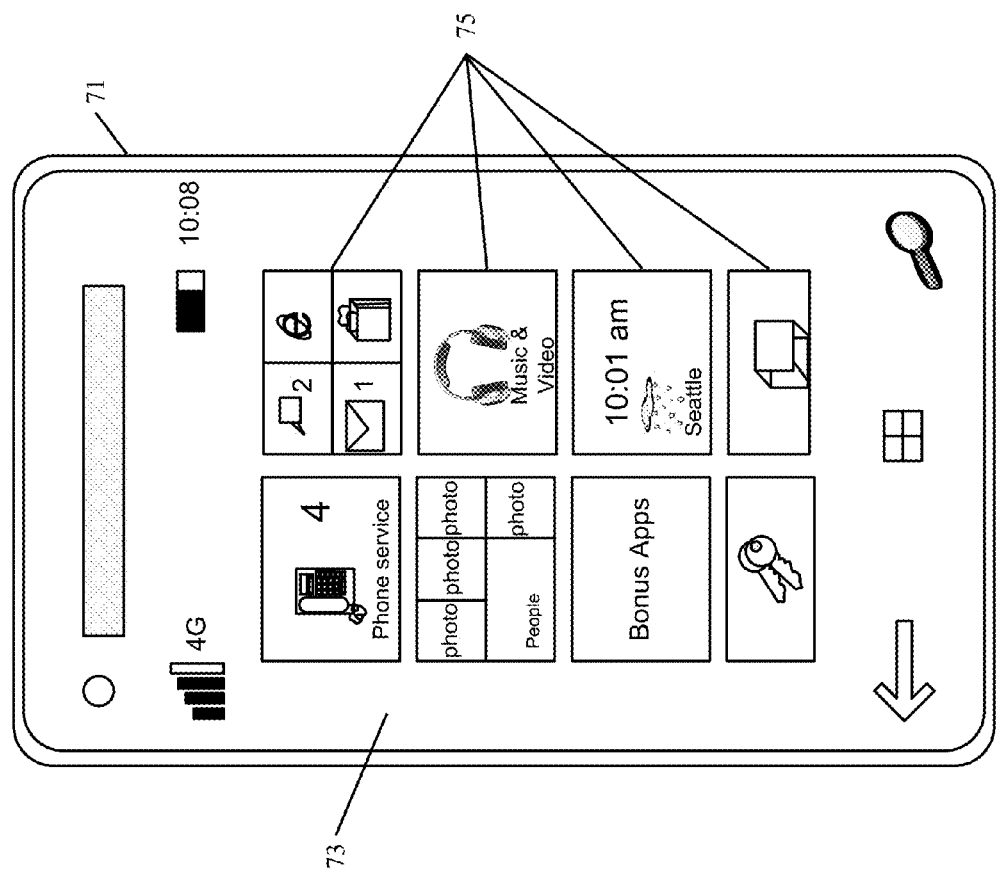
Figure 10:
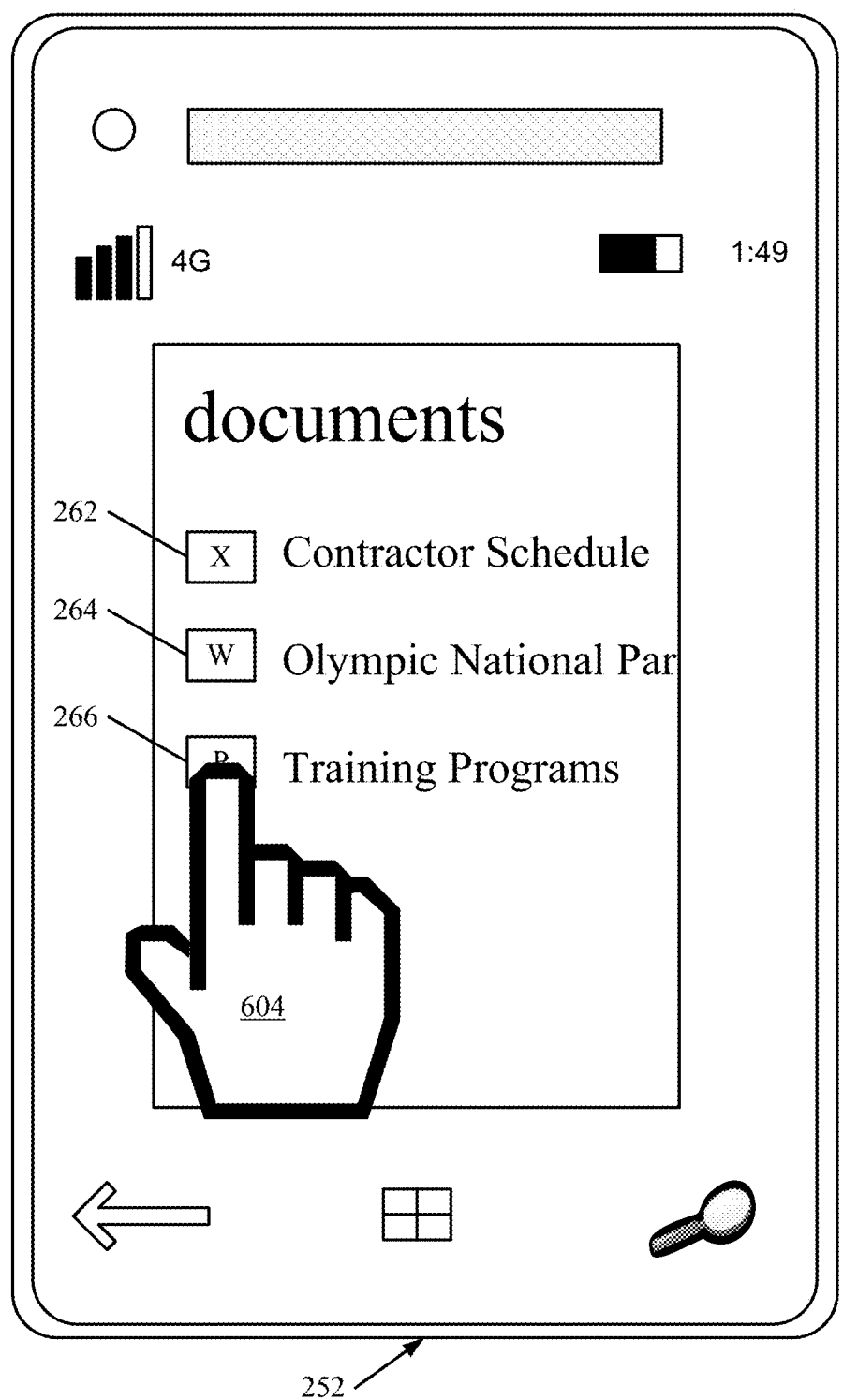

FIG. 9 is similar to FIG. 7 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 10 shows phone 71 with the display of FIG. 3B displayed on it.

Note that other forms of the devices 16 are possible.

Figure 11:
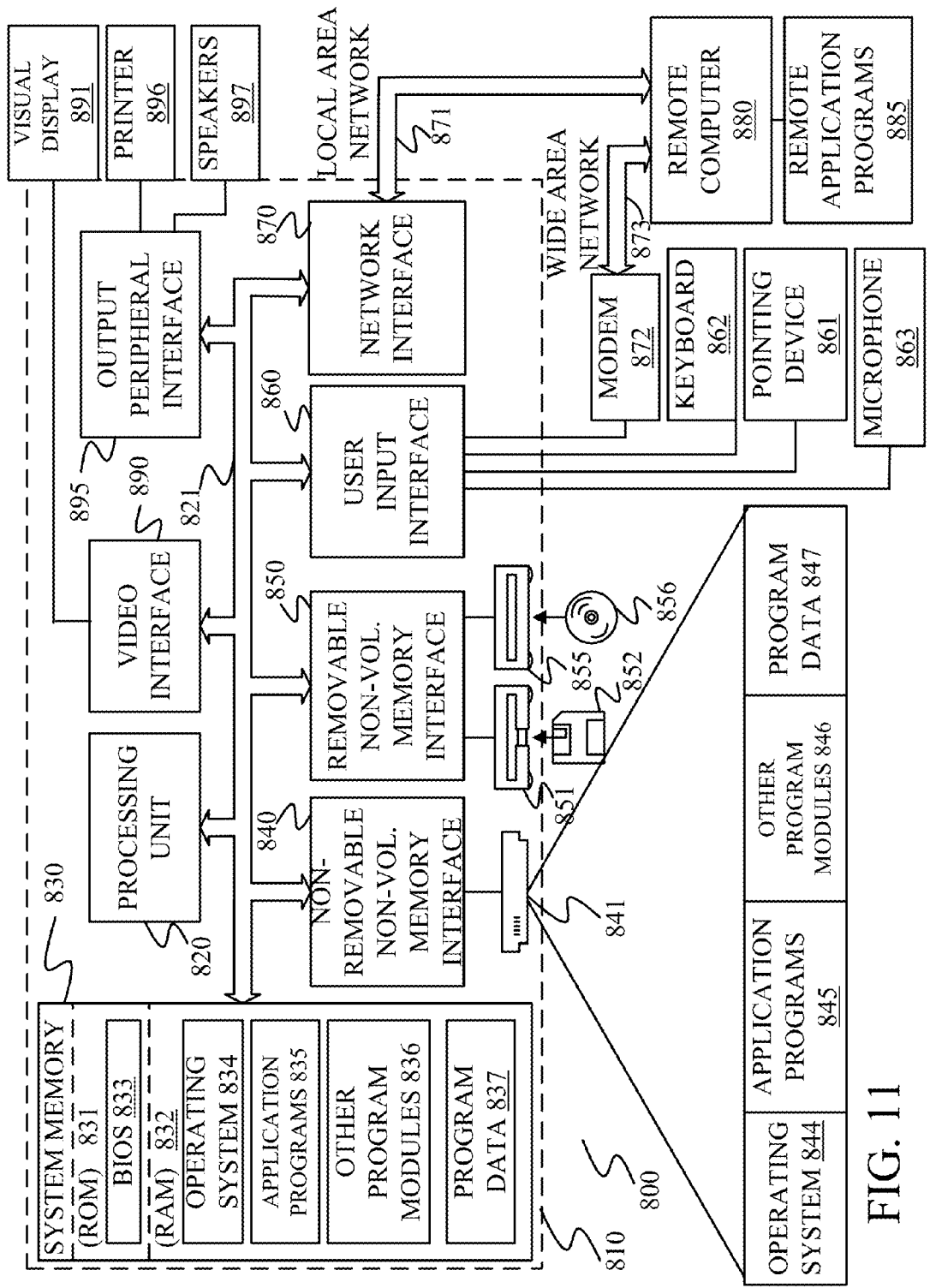
FIG. 11 is a block diagram of one illustrative computing device.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 106 or 132, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
receiving, by a mobile device, data structure metadata corresponding to a first application display displayed by an application on a computing device that is separate from the mobile device, wherein the data structure metadata is indicative of a layout of a plurality of display elements on the first application display;
generating, by the mobile device, a second application display based on the data structure metadata, the second application display being different from the first application display and displaying information from the first application display, wherein generating the second application display comprises:
analyzing, by the mobile device, the received data structure metadata indicative of the layout of the plurality of display elements on the first application display;
based on the analysis of the received data structure metadata, selecting, by the mobile device, a first subset of the display elements to display on the modified application display,
the first subset comprising some, but not all, of the plurality of display elements;
modifying, by the mobile device, the layout of display elements that are on the first application display to obtain a modified application display that includes the first subset of the display elements; and
displaying the modified application display, as the second application display, on the mobile device;
receiving a user interaction input interacting with the second application display; and
in response to the user interaction input, performing local processing on the mobile device to further modify the second application display, wherein the local processing is performed on the mobile device without communicating information to the application on the computing device and comprises:
selecting, by the mobile device, a second subset of the display elements to display on the modified application display,
the second subset comprising some, but not all, of the plurality of display elements, and the second subset including at least one display element not included in the first subset.

2. The computer-implemented method of claim 1 and further comprising:
sending user interaction information to the application on the computing device to control the application on the computing device.

3. The computer-implemented method of claim 2 wherein receiving a user interaction input comprises:
receiving a document launch input on the second application display, to open a document in the application, and wherein sending user interaction information comprises sending launch information to open the document on the computing device.

4. The computer-implemented method of claim 2 wherein receiving a user interaction input comprises:
receiving a data manipulation input on the second application display on the mobile device to manipulate data on the first application display on the computing device, and wherein sending user action information comprises sending data manipulation information to manipulate the data on the first application display on the computing device.

5. The computer-implemented method of claim 2 wherein receiving a user interaction input comprises:
receiving an application switch user input to switch focus to a different application on the computing device, and wherein sending user interaction information comprises sending application switch information to switch the focus to the different application on the computing device.

6. The computer-implemented method of claim 1, wherein the data structure metadata is provided from an add-in component that is provided as an add-in for an application on a computing device that is separate from the mobile device.

7. The computer-implemented method of claim 1 wherein modifying the layout of the display elements that are on the first application display comprises at least one of:
modifying a configuration of the display elements to display on the modified application display; or
modifying a size of the display elements to display on the modified application.

8. The computer-implemented method of claim 1 wherein the computing device includes a non-touch sensitive display screen and wherein receiving a use interaction input comprises:
receiving a touch input on the second application display on the mobile device, and wherein sending user interaction information comprises:
sending an application control input to the computing device to control the application on the computing device, based on the touch input received on the second application display on the mobile device.

9. The computer-implemented method of claim 2 and further comprising:
prior to receiving the data structure metadata on the mobile device, receiving a set of application identifiers on the mobile device identifying programs on the computing device; and
requesting the data structure metadata, for each identified program, from an add-in component corresponding to each identified program.

10. The computer-implemented method of claim 9 wherein receiving the set of application identifiers comprises:
receiving the set of application identifiers identifying open or recently used programs on the computing device.

11. The computer-implemented method of claim 9 wherein requesting the data structure metadata comprises:
interrogating a public model corresponding to each identified program.

12. A mobile device, comprising:
a mobile remote component configured to:
receive an application identifier from a computing device that is separate from the mobile device;
based on the application identifier, identify an application program executable on the computing device;
based on identifying the application program, interrogate an add-in component, comprising an add-in for the application program executable on the computing device, for data structure metadata indicative of a layout of a plurality of display elements displayed by the application program, as a computing device display, on the computing device; and
receive the data structure metadata from the add-in component in response to the interrogation;
a display device; and
a display generator component configured to:
analyze the data structure metadata;
based on the analysis of the data structure metadata, select a first subset of the display elements to display on a modified application display, the first subset comprising some, but not all, of the plurality of display elements; and
generate the modified application display on the display device using a computer processor, the modified application display being modified from the computing device display and displaying the first subset of the display elements;
receive a user interaction input interacting with the modified application display; and
in response to the user interaction input, perform local processing on the mobile device to further modify the modified application display, wherein the local processing is performed on the mobile device without communicating information to the application on the computing device and comprises:
selecting, by the mobile device, a second subset of the display elements to display on the modified application display,
the second subset comprising some the plurality of display elements, and the second subset including at least one display element not included in the first subset.

13. The mobile device of claim 12 wherein the display device comprises a touch sensitive display device and wherein the display generator component is configured to receive a touch input on the mobile device display and wherein the mobile remote component is configured send a program control input to the computing device to control the program on the computing device, based on the touch input received on the mobile device display.

14. The mobile device of claim 12 wherein the display generator component is configured to receive a program launch input on the mobile device display to launch a different program on the computing device and wherein the mobile remote component is configured to send launch information to launch the different program on the computing device.

15. The mobile device of claim 12 wherein the display generator component is configured to receive a data manipulation input on the mobile device display to manipulate data on the computing device display on the computing device, and wherein mobile mote component is configured to send data manipulation information to manipulate the data on the computing device display on the computing device.

* * * * *